US008618019B2

(12) United States Patent
Kamizono et al.

(10) Patent No.: US 8,618,019 B2
(45) Date of Patent: Dec. 31, 2013

(54) METHOD FOR PRODUCING PLATINUM NANOPARTICLES

(75) Inventors: Takeshi Kamizono, Ama-gun (JP); Gang Xie, Anjo (JP); Minoru Inaba, Kyotanabe (JP)

(73) Assignees: Aisin Seiki Kabushiki Kaisha, Kariya-shi (JP); Toyota Jidosha Kabushiki Kaisha, Toyota-shi (JP); The Doshisha, Kyoto-shi (JP)

( * ) Notice: Subject to any disclaimer, the term of this patent is extended or adjusted under 35 U.S.C. 154(b) by 592 days.

(21) Appl. No.: 12/491,799

(22) Filed: Jun. 25, 2009

(65) Prior Publication Data
US 2009/0325795 A1 Dec. 31, 2009

(30) Foreign Application Priority Data

Jun. 26, 2008 (JP) .................................. 2008-167368
Sep. 25, 2008 (JP) .................................. 2008-245392
Mar. 13, 2009 (JP) .................................. 2009-061265

(51) Int. Cl.
B01J 23/42 (2006.01)
B01J 21/00 (2006.01)
C22B 11/00 (2006.01)
B22F 1/00 (2006.01)

(52) U.S. Cl.
USPC ................ 502/339; 502/261; 423/22; 75/343

(58) Field of Classification Search
USPC .................................................. 502/334, 339
See application file for complete search history.

(56) References Cited

U.S. PATENT DOCUMENTS

| 2006/0099488 | A1* | 5/2006 | Daimon et al. ................. 429/44 |
| 2007/0068343 | A1* | 3/2007 | Lukehart et al. ................ 75/370 |
| 2007/0099069 | A1* | 5/2007 | Min et al. ......................... 429/44 |
| 2007/0190551 | A1* | 8/2007 | Mirkin et al. ..................... 435/6 |

FOREIGN PATENT DOCUMENTS

| JP | 62-61630 | | 3/1987 | |
| JP | 2002-42825 | * | 2/2002 | ............... B01J 23/42 |
| JP | 2002 042825 | * | 2/2002 | |
| JP | 2002042825 | * | 2/2002 | |
| JP | 2002-231257 | | 8/2002 | |
| JP | 2003-268424 | | 9/2003 | |
| JP | 2007-131926 | * | 5/2007 | ............... B22F 9/26 |
| JP | 2007 131926 | * | 5/2007 | |
| JP | 2007131926 | * | 5/2007 | |

OTHER PUBLICATIONS

T.S. Ahmadi, et al., ""Cubic" Colloidal Platinum Nanoparticles", Chemistry of Materials, vol. 8, No. 9, Jun. 1996, 3 pgaes.
Minoru Inaba, et al., "Controlled growth and shape formation of platinum nanoparticles and their electrochemical properties", Electrochimica Acta, 52, 2006, pp. 1632-1638.
Mami Yamada, et al., "Synthesis and Size Control of Cubic Pt nanoparticles for Development of Efficient Fuel Cell Catalyst", The Journal of Fuel Cell Technology, vol. 5, No. 3, 2006, pp. 69-72 (with English Abstract).
Japanese Office Action issued Jan. 12, 2012 in patent application No. 2009-061265 with English extracted translation.

* cited by examiner

*Primary Examiner* — Bijay Saha
(74) *Attorney, Agent, or Firm* — Oblon, Spivak, McClelland, Maier & Neustadt, L.L.P.

(57) ABSTRACT

A producing method includes a preparing step of preparing a chemical compound having at least one of elements of alkali metals and alkali earth metals along with platinum, and a reducing step of reducing the prepared chemical compound with a reducing agent to form platinum nanoparticles.

8 Claims, 19 Drawing Sheets

LiI

KBr

NaBr

50nm

RbBr

LiBr

The structure of sodium polyacrylate(PAA)

METHOD FOR PRODUCING PLATINUM NANOPARTICLES

INCORPORATION BY REFERENCE

The present invention is based on Japanese Patent Application No. 2008-167368, filed on Jun. 26, 2008, 2008-245392, filed on Sep. 25, 2008 and 2009-061265, filed on Mar. 13, 2009, the entire contents of which are incorporated herein by reference.

BACKGROUND OF THE INVENTION

1. Field of the Invention

The present invention relates to a method for producing platinum nanoparticles with nanometer sizes and polyhedral shapes.

2. Description of Related Art

Recently, it has been known that platinum nanoparticles with polyhedral shapes are excellent in performance such as catalytic activity, etc., as compared with spherical platinum nanoparticles. "Chemistry of Materials, 8 (1966) (pages 1161-1163)" and "Electrochimica Acta, 52(2006) (pages 1632-1638)" disclose techniques of synthesizing platinum nanoparticles through the liquid-phase reduction method using platinum complexes, and with these techniques, polyhedral platinum nanoparticles of which (100) faces exhibit high reaction activity are synthesized by selectively adsorbing sodium polyacrylate as a capping reagent on the (100) faces of platinum crystal nuclei to stop the growth of the (100) faces while promoting the growth of (111) faces. These documents disclose that carbonyl groups in side chains of sodium polyacrylate are bonded to surfaces of platinum to operate as the capping reagent.

"FUEL CELL, 5(2006)" (pages 69-72) discloses the technique of producing polyhedral platinum particles having (100) faces that exhibit high reaction activity by adding sodium iodide (NaI) along with sodium polyacrylate.

With the techniques of the above-described documents, sodium polyacrylate has been used as the capping reagent exhibiting aggregation inhibition effect. However, sodium polyacrylate exhibits a high viscosity so that it is difficult to readily wash off. Therefore, there is a limit in enhancing the recovery rate of platinum particles with polyhedral shapes. In addition, since a considerable amount of sodium polyacrylate remains in assemblies of platinum nanoparticles, the inherent performance of platinum nanoparticles, such as catalytic activity, etc. may be deteriorated.

And Japanese patent application laid-open No. 2002-42825 discloses a method for forming platinum nanoparticles on carbon black, which includes the steps of dissolving potassium tetrachloroplatinate and sodium polyacrylate in water to prepare an aqueous solution thereof, bubbling hydrogen in the prepared aqueous solution to form a colloidal solution of platinum, adding carbon black to the colloidal solution of platinum, adsorbing colloidal particles on carbon black particles after adjusting the pH of the colloidal solution of platinum to 3 through 12, and separating carbon black on which the colloidal particles have been adsorbed from the liquid. By carrying out these steps sequentially, platinum particles with cubic shapes or tetrahedral shapes are supported on surfaces of carbon black particles.

Japanese patent application laid-open No. 2007-131926 discloses a method for forming platinum nanoparticles, which includes the steps of mixing a solution of a platinum compound, specific adsorption chemical species composed of cations or anions, and sodium polyacrylate with each other, and growing platinum crystals with the deposition from the solution of the platinum compound. In embodiments of this document, an aqueous solution of sodium polyacrylate is added to a solution of platinic acid chloride, and an aqueous solution of sodium iodide or sodium sulfate is further added thereto to prepare a mixture liquid, and then, hydrogen gas is blown in the prepared mixture liquid to reduce platinic acid chloride. In this method, carbon black is mixed in a colloidal solution of platinum in which platinum nanoparticles have been formed by bubbling hydrogen. Since carbon black is mixed in the colloidal solution of platinum after the formation of platinum nanoparticles, platinum nanoparticles may not been favorably supported on particles of carbon black so as to be separated therefrom. In this case, the platinum nanoparticles may aggregate to increase the particle diameter thereof, and exposed crystal faces may vary.

SUMMARY OF THE INVENTION

The present invention has been made by developing the above-described techniques, and has an object of providing a method for producing platinum nanoparticles, which is capable of restraining problem due to residue of sodium polyacrylate exhibiting a high viscosity, and is advantageous in enhancing the recovery rate of platinum particles with polyhedral shapes, and ensuring inherent performance of the platinum nanoparticles, such as catalytic performance, etc.

According to a first aspect of the method for producing platinum nanoparticles, a preparing step of preparing a chemical compound having at least one element of alkali metals and alkali earth metals along with platinum, and a reducing step of reducing the prepared chemical compound with a reducing agent to form platinum nanoparticles are carried out.

According to a second aspect of the method for producing platinum nanoparticles, a preparing step (mixing step) of mixing a chemical compound having at least one element of alkali metals and alkali earth metals with a solution of a platinum compound to form a mixture, and a reducing step of reducing the mixture with a reducing agent to form platinum nanoparticles are carried out.

According to a third aspect of the method for producing platinum nanoparticles, the preparing step includes a preparing step of preparing a carbon support, a dispersion medium, a platinum compound having platinum, an adsorbent having at least one element of alkali metals and alkali earth metals, which is adsorbable on surfaces of the carbon support, and a capping reagent capable of capping specific areas of platinum crystals, and a first mixture liquid forming step of forming a first mixture liquid in which the dispersion medium, the carbon support, the platinum compound and the adsorbent are mixed, and a second mixture liquid forming step of forming a second mixture liquid in which the first mixture liquid and a capping reagent are mixed, and in the reducing step, the second mixture liquid is reduced with a reducing agent to form platinum nanoparticles and support the platinum nanoparticles on the carbon support.

EXPLANATION OF PREFERRED EMBODIMENTS

Figure 1:
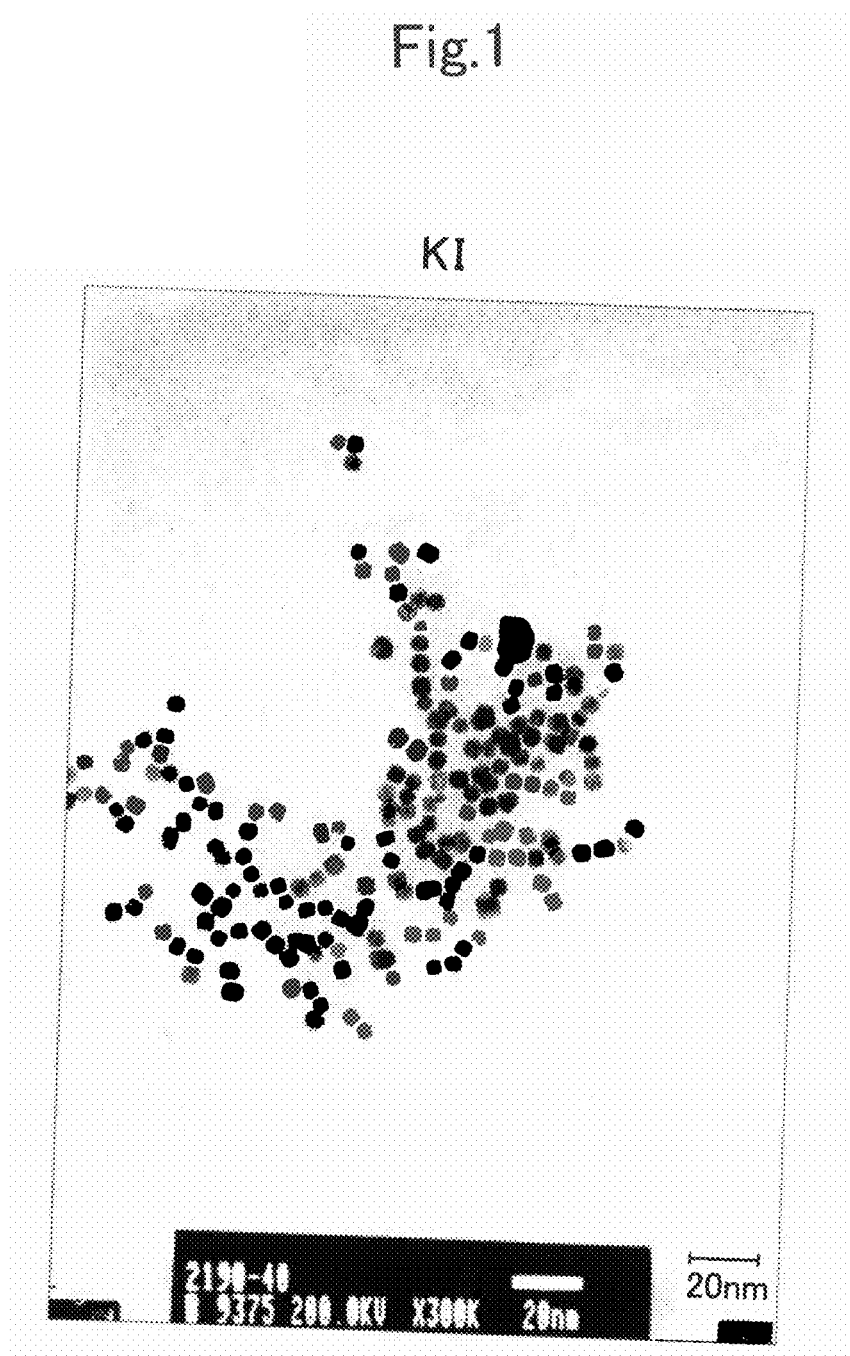
FIG. 1 is an electron microscope photograph (TEM) of platinum nanoparticles in a first embodiment of a method for producing platinum nanoparticles, in which PAA is not used.

A single chemical compound or a mixture of a plurality of chemical compounds may be used as the chemical compound. Examples of the chemical compound include platinum compounds having at least one of alkali metals and alkali earth metals, such as potassium tetrachloroplatinate ($K_2PtCl_4$), etc. The alkali metals and the alkali earth metals can include at least one of sodium (Na), potassium (K), rubidium (Rb), caesium (Cs), beryllium (Be), magnesium (Mg), calcium (Ca), strontium (Sr) and barium (Ba). Sodium (Na), potassium (K), rubidium (Rb) and caesium (Cs) are alkali metals, and beryllium (Be), magnesium (Mg), calcium (Ca), strontium (Sr) and barium (Ba) are alkali earth metals.

It is preferable that the chemical compound is a halide having at least one element of alkali metals and alkali earth metals. Examples of the halide include at least one of an iodide, a chloride, and a bromide. Examples of the iodide include at least one of potassium iodide (KI), rubidium iodide (RbI), caesium iodide (CsI), lithium iodide (LiI) and sodium iodide (NaI). Examples of the chloride include at least one of potassium chloride (KCl), rubidium chloride (RbCl), caesium chloride (CsCl), lithium chloride (LiCl) and sodium chloride (NaCl). Examples of the bromide include at least one of potassium bromide (KBr), rubidium bromide (RbBr), caesium bromide (CsBr) and lithium bromide (LiBr).

With the methods of the first and second aspects, sodium polyacrylate is not used as the capping reagent, or the amount thereof is reduced.

A solution of a platinum salt, in particular, a solution of a platinum chloride, is preferable as the solution of the platinum compound according to the second aspect. Examples of the platinum chloride include at least one of platinic acid chloride, potassium tetrachloroplatinate, platinum potassium tetrachloride, platinum chloride and dihydrogen hexachloroplatinate hexahydrate. These materials may by used solely, or two or more kinds thereof may be used. In addition, examples of the platinum compound include diammine dinitro platinum, hexaammine platinum tetrachloride, tetraammine platinum dichloride, platinic acid iodide, platinic acid boride and platonic acid fluorid. Examples of the platinum compound further include a sodium salt, a potassium salt and a lithium salt thereof.

The methods according to the first and second aspects enable the stopping or reducing of the use of sodium polyacrylate exhibiting a high viscosity. Consequently, the cleaning treatment can be made simple, and the cleaning costs can be reduced. In addition, these methods are advantageous, because problems caused by the residue of sodium polyacrylate exhibiting a high viscosity can be restrained, the recovery rate of the platinum particles with polyhedral shapes can be enhanced, and the inherent performance of the platinum nanoparticles, such as catalytic performance, can be obtained.

In a typical example of the producing method, at least one of an iodide, a chloride and a bromide, which contain at least one element of alkali metals and alkali earth metals, are mixed with a platinum complex solution with a predetermined concentration, thereby forming a mixture. The concentration of the platinum complex solution depends on the composition of the platinum complex, the required size of the platinum nanoparticles, the aggregation degree of the platinum nanoparticles, etc., but can be determined to range from $10^{-2}M$ to $10^{-8}M$, for example. It is preferable that the platinum complex does not aggregate in the solution of the platinum complex. It is preferable that this mixture does not contain sodium polyacrylate. In some cases, this mixture may contain sodium polyacrylate.

The number of moles of the iodide depends on the composition of the platinum complex, the required size of the platinum nanoparticles, the aggregation degree of the platinum nanoparticles, etc., but can range from 1 to 150 times, from 5 to 100 times, from 10 to 70 times, or 20 to 40 times, as large as that of the platinum complex. Similarly, the number of moles of the chloride can range from 1 to 150 times, from 5 to 100 times, from 10 to 70 times, or from 20 to 40 times, as large as that of the platinum complex. The number of moles of the bromide can range, similarly to those of the iodide and the chloride.

In the reducing step, the above-described mixture is reduced with a reducing agent to prepare platinum nanoparticles. Hydrogen is used as one example of the reducing agent. Therefore, it is preferable that the reducing step is carried out with bubbling of blowing hydrogen gas in the mixture. The reducing step can be carried out at room temperature. The time required for the reduction step is not specifically limited provided that the platinum complex can be reduced. The time required for the reducing step depends on the composition of the platinum complex, the required size of the platinum nanoparticles, the aggregation degree of the platinum nanoparticles, the flowing rate of hydrogen gas, etc, but can be determined to be the time ranging from 1 minute to 100 hours, from 5 minutes to 50 hours, or from 1 hour to 20 hours, for example.

The preparing step (mixing step) and the reducing step can be carried out at about room temperature such that the operation in each step can be readily performed, but may be also carried out in another temperature range from 2 to 80° C., from 5 to 60° C., or from 10 to 30° C., for example. It is preferable that this mixture is allowed to stand for a predetermined time after the reducing step. The mixture can be allowed to stand in air atmosphere or under pressurized atmosphere. By allowing the mixture to stand, the reduction reaction of ions of the platinum complex can be made to further proceed. The time required for allowing the mixture to stand is not specifically limited, but is determined to range from 1 minute to 200 hours, from 10 minutes to 100 hours, or from 1 hour to 20 hours, for example, according to the composition of the platinum complex, the required size of the platinum nanoparticles, the aggregation degree of the platinum nanoparticles, the flowing rate of hydrogen gas, the required productivity, etc.

The produced platinum nanoparticles have polyhedral shapes. In particular, it is preferable that they have cubic shapes (inclusive of substantially cubic shapes) or 14-hedral shapes. It has been known that the produced platinum nanoparticles with polyhedral shapes exhibit excellent performance such as catalytic activity, as compared with the platinum nanoparticles with spherical shapes. The method in accordance with the present invention can be used for the production of catalysts held with membrane electrode assemblies of fuel cells, reforming catalysts in reforming devices, catalysts held with exhaust gas purifying devices, etc.

It is preferable that each of the platinum nanoparticles has a size of 70 nm or less, 60 nm or less, or 50 nm or less. It is more preferable that each platinum nanoparticle has a size of 40 nm or less, 30 nm of less, 20 nm or less, or 10 nm or less. The platinum nanoparticles can be formed into single crystals, but may not be formed into single crystals. It is preferable that the produced platinum nanoparticles are separated from each other in a non-contact state, but they may have shapes like secondary particles in which a plurality of platinum nanoparticles aggregate. It is preferable that the secondary particles have particle diameters of 150 nm or less, 80 nm or less, 70 nm or less, 50 nm or less, 30 nm or less, or 10 nm or less.

In the methods according to the first and second aspects, as described above, sodium polyacrylate (will be referred to as PAA) is not used, or the amount thereof is reduced to 5 or less, 3 or less, or 1 or less, in molar ratio relative to platinum of 1 in the chemical compound. The molar ratio of PAA may be 0. It is preferable that this mixture does not contain PAA.

The reason the polyhedral platinum nanoparticles exhibiting low aggregation degrees can be obtained even where PAA is not contained, or the amount of PAA is small, has not been sufficiently clarified, but is estimated that anions are adsorbed on specific crystal faces of nuclei of platinum nanoparticles, and cations are adsorbed on peripheries of the adsorbed anions to restrain the growth of specific faces of crystals in the growing process of platinum crystals, thereby promoting the growth of other specific crystal faces of crystals. When PAA is contained, similarly to the conventional techniques, the cleaning properties and the platinum recovering properties lower, but platinum nanoparticles are formed.

And, it is preferable that the mixture according to the first aspect contains platinum, alkali metals and/or alkali earth metals and PAA in molar ratio of 1:(1~150):5 or less. In particular, in order to make the cleaning step of the platinum nanoparticles simple, it is preferable to decrease the molar ratio of PAA, and consequently, the preferred molar ratio is 1:(5~100):3 or less, or 1:(5~100):1 or less. Considering the cleaning properties, it is preferable to determine the molar ratio of PAA to be 0.

And, it is preferable that the mixture according to the second aspect contains platinum, alkali metals or alkali earth metals and PAA in molar ratio of 1:(1~150):5 or less. In particular, in order to make the cleaning step of the platinum nanoparticles simple, it is preferable to decrease the molar ratio of PAA, and consequently, the preferred molar ratio is 1:(5~100):3 or less, or 1:(5~100):1 or less. Considering the cleaning properties, it is preferable to determine the molar ratio of PAA to be 0.

With the methods according to the first and second aspects, as described above, it is preferable that PAA is not used or the amount of PAA is reduced. But, PAA may be used, similarly to the method according to the third aspect. In this case, both an adsorbent and a capping reagent are used. The present inventors have found that upon adding both the adsorbent and the capping reagent, the order of adding the adsorbent to a carbon support, and the order of adding the capping reagent thereto greatly influence the formation of the platinum nanoparticles, and have confirmed the same through experiments.

More specifically, with the method according to the third aspect, first, a carbon support, a dispersion medium, a platinum compound having platinum, an adsorbent adsorbable on surfaces of the carbon support, and a capping reagent capable of capping specific areas of platinum crystals are prepared. Then, a first mixture liquid in which the dispersion medium, the carbon support, the platinum compound and the adsorbent are mixed is formed. Next, by mixing the first mixture liquid and the capping reagent with each other, a second mixture liquid is formed. Afterwards, the second mixture liquid is subjected to the reduction treatment with a reducing agent to form platinum nanoparticles and support the platinum nanoparticles on the carbon support. The present inventors have noticed that by adding the capping reagent in the latter half of the method, the capping reagent can be restrained from being excessively adsorbed on the carbon support, whereby the capping reagent can be effectively used, and the platinum nanoparticles with polyhedral shapes can be effectively supported on the carbon support.

The reason therefor has not been sufficiently clarified, but is estimated as follows. Namely, (i) the capping reagent is readily adsorbed on the surfaces of the carbon support, (ii) where the capping reagent is adsorbed on the surfaces of the carbon support, the capping reagent is difficult to exhibit its inherent function, i.e., capping specific areas of platinum crystals, whereby the capping reagent cannot favorably act on platinum, and consequently, the polyhedral shape of the platinum nanoparticle is difficult to grow. Accordingly, it is estimated that by previously mixing the carbon support and the adsorbent with each other to adsorb the adsorbent on the surfaces of the carbon support before mixing the carbon support and the capping reagent, and then blending the capping reagent in the mixture, the capping reagent that is readily adsorbable on the surfaces of the carbon support is restrained from being excessively adsorbed on the surfaces of the carbon support, and the capping reagent can readily achieve the inherent function of capping specific areas of the platinum crystals.

Accordingly, in the method according to the third aspect, the preparing step includes (i) a preparing step of preparing a carbon support, a dispersion medium, a platinum compound having platinum, an adsorbent having at least one element of alkali metals and alkali earth metals, which is adsorbable on surfaces of the carbon support, and a capping reagent capable of capping specific areas of platinum crystals, (ii) a first mixture liquid forming step of forming a first mixture liquid in which the dispersion medium, the carbon support, the platinum compound and the adsorbent are mixed, and afterwards, (iii) a second mixture liquid forming step of forming a second mixture liquid in which the first mixture liquid and the capping reagent are mixed. Examples of the capping reagent include at least one of PAA, polyvinylpyrrolidone, polyvinyl alcohol, polyacrylamide, polyethyleneimine and polyethylene oxide. In this case, it is preferable that in the reducing step, the second mixture liquid is reduced with a reducing agent to form platinum nanoparticles, and support the platinum nanoparticles on the carbon support.

The carbon support used in the method according to the third aspect is a conductive support exhibiting conductivity capable of supporting platinum nanoparticles, and examples thereof include granular carbon and/or fibrous carbon. Where the carbon support is granular, examples of the average particle diameter thereof include ranges from 5 nm to 100 μm, from 10 nm to 50 μm, and from 20 nm to 5 μm. In addition, examples also include ranges from 10 to 10000 nm, from 20 to 5000 nm, from 20 to 1000 nm, and from 20 to 100 nm. Where the carbon support is granular, the specific surface area thereof is measured with BET method (N2), and examples thereof include ranges from 20 to 4000 $m^2/g$, from 30 to 3500 $m^2/g$ and from 40 to 3000 $m^2/g$. Examples of the carbon support include carbon black, carbon nanotube (inclusive of carbon nanophone), carbon nanowall, graphite, pitch, coke powder, etc. Examples of carbon black include acetylene black, furnace black, thermal black, lamp black, etc.

In the case of the fibrous support, examples of the average diameter include ranges from 2 to 1000 nm, and from 20 to 500 nm, and carbon fibers such as long carbon fibers and short carbon fibers are exemplified as the fibrous support.

With the method according to the third aspect, it is preferable that the adsorbent is composed of a halide of at least one element of alkali metals and alkali earth metals. Examples of the halide include at least one of an iodide, a chloride, and a bromide. In particular, an iodide of at least one element of alkali metals and alkali earth metals, a chloride of at least one element of alkali metals and alkali earth metals, and a bromide of at least one element of alkali metals and alkali earth metals are exemplified.

Examples of the iodide include at least one of potassium iodide (KI), rubidium iodide (RbI), caesium iodide (CsI), lithium iodide (LiI) and sodium iodide (NaI). Examples of the chloride include at least one of potassium chloride (KCl), rubidium chloride (RbCl), caesium chloride (CsCl), lithium chloride (LiCl) and sodium chloride (NaCl). Example of the bromide include at least one of potassium bromide (KBr), sodium bromide (NABr), caesium bromide (CsBr) and lithium bromide (LiBr).

With the method according to the third aspect, examples of the platinum compound include a solution of a platinum complex. The concentration of the solution of the platinum complex depends on the composition of the platinum complex, the required size of the platinum nanoparticles, the aggregation degree of the platinum nanoparticles, etc., but can be determined to range from $10^{-2}$M to $10^{-8}$M (moliliter), for example. It is preferable that the platinum complex do not aggregate in the solution of the platinum complex. The number of moles of the iodide depends on the composition of the platinum compound such as the platinum complex, the required size of the platinum nanoparticles, the aggregation degree of the platinum nanoparticles, etc. but can have the number of mole, which ranges from 1 to 150 times, from 5 to 100 times, from 10 to 70 times, or from 20 to 40 times that of platinum in the platinum compound. Similarly, the chloride can have the number of moles, which ranges from 1 to 150 times, from 5 to 100 times, from 10 to 70 times, or from 20 to 40 times that of the platinum. Bromides can have a similar number of moles to those of the iodide or the chloride.

With the method according to the third aspect, it is preferable that the first mixture liquid forming step includes a step of mixing the carbon support and the dispersion medium to prepare a dispersion liquid, and a step of mixing the dispersion liquid, the adsorbent, and the platinum compound to prepare the first mixture liquid. In this case, the adsorbent may be mixed in the dispersion liquid prior to the platinum compound, or the platinum compound may be mixed in the dispersion liquid prior to the adsorbent. And the first mixture liquid forming step can include a step of mixing the carbon support, the dispersion medium and the adsorbent at approximately the same time to prepare the first mixing liquid.

In a preferred embodiment, in the first mixture liquid forming step, the platinum compound is mixed in the dispersion liquid in which the carbon support has been dispersed, and then, the adsorbent is mixed in the dispersion liquid, thereby forming the first mixture liquid.

In another preferred embodiment, in the first mixture liquid forming step, one part of the adsorbent is mixed in the dispersion liquid in which the carbon support has been dispersed, nextly, the platinum compound is mixed in the dispersion liquid, and afterwards, the remaining part of the adsorbent is mixed in the dispersion liquid, thereby forming the first mixture liquid. In this case, in the first mixture liquid forming step, the adsorbent is dividingly mixed in the dispersion liquid before and after the mixing time of the platinum compound. Consequently, the carbon support, the adsorbent, the platinum compound and the adsorbent are mixed sequentially in this order. As a result, it can be expected to dispose the platinum compound between the adsorbent, and consequently, to enhance the contact area and the contact frequency between the adsorbent and the platinum compound. Therefore, where the adsorbent exhibits such properties as to form polyhedral platinum particles against the platinum compound, it is more advantageous in forming the polyhedral platinum particles on surfaces of the carbon support.

With the method according to the third aspect, it is preferable to allow the second mixture liquid to stand for a predetermined time after the reducing step. The second mixture liquid can be allowed to stand in air atmosphere or under pressurized atmosphere. By allowing the second mixture liquid to stand, the reduction reaction of ions of the platinum complex can be made to further proceed. The standing time is not specifically limited, but depends on the composition of the platinum complex, the required size of the platinum nanoparticles, the aggregation degree of the platinum nanoparticles, the flow rate of hydrogen gas to be supplied, the required productivity, etc. Examples thereof include the times ranging from 1 minute to 200 hours, from 10 minutes to 100 hours, and from 1 hour to 2 hours. But it is not limited to these times.

The capping reagent used in the method according to the third aspect is capable of capping specific areas of platinum crystals. It is preferable that the capping reagent is a polymer-based capping reagent such as a water-soluble acrylic acid polymer. Examples of the capping reagent include at least one of PAA, polyvinylpyrrolidone, polyvinyl alcohol, polyacrylamide, polyethyleneimine and polyethylene oxide. The capping reagent caps specific areas of crystals of platinum while promoting the growth of the other specific areas thereof. In addition, the capping reagent is used to enable the surfaces of crystals of the platinum nanoparticles to effectively contribute to the catalytic action, and also used to prevent the platinum nanoparticles from aggregating due to the growing of platinum crystals.

Figure 15:
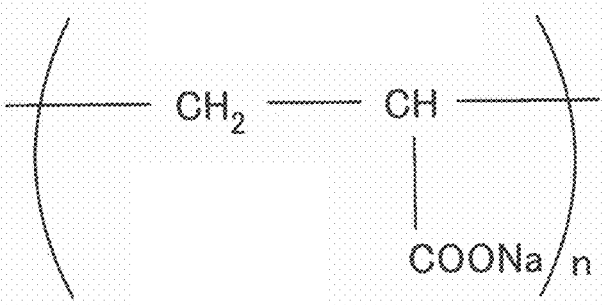
FIG. 15 is a view showing the structure of sodium polyacrylate.

It is preferable that the capping reagent has such a structure as to be readily adsorbed on specific surfaces of the crystals of the platinum nanoparticles in molecules thereof. Examples of such a structure include a hydrophilic group (—COONa group, etc.). PAA acting as the capping reagent has the structure shown in FIG. 15, and is a polymer including the —COONa group as a side chain thereof. In this case, it is estimated that —COO⁻ structure of the —COONa group acts on the platinum crystals with the electrostatic interaction, or is adsorbed on the platinum crystals, thereby capping specific areas of the crystals composing the platinum nanoparticles. And it is estimated that by virtue of polymer chains interposed between the platinum nanoparticles, the aggregation of the platinum nanoparticles is restrained, thereby restraining the lowering of the catalytic activity.

With the method according to the third aspect, where PAA is used as a stabilization polymer acting as the capping reagent, the weight average molecular weight of PAA can range from 1000 to 50000, from 3000 to 10000, or from 4000 to 8000. The weight average molecular weight of PAA can be obtained in terms of polystyrene using GPC (gel permeation chromatography), for example. Where the stabilization polymer acting as the capping reagent also exhibits properties as a surfactant, it achieves the function of restraining the precipitation of particles of the carbon support such as carbon black, etc. When the dispersion properties of the carbon support such as carbon black, etc. in the second mixture liquid is improved, the formation efficiency of the platinum nanoparticles on the carbon support can be enhanced.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Embodiments 1 through 13 correspond to the methods according to the first and the second aspects, in which PAA is not used or the amount of PAA is reduced.

Embodiment 1

Embodiment 1 of the present invention, in which PAA is not used, will be explained. Potassium iodide (KI, halide of alkali metal) was added to a predetermined volume (300 cc) of a solution of potassium tetrachloroplatinate ($K_2PtCl_4$, complex compound, ionic platinum compound) (temperature: room temperature) with a concentration of $1\times10^{-4}$ M, thereby preparing a mixture. The atmosphere was determined to be air atmosphere. "M" represents the molarity that is the number of moles of a solute in 1 liter (1 L, 1 dm³) of a solution. This mixture does not contain PAA. The number of moles of potassium iodide (KI) to be added is 25 times that of the platinum complex (the number of moles of potassium tetrachloroplatinate ($K_2PtCl_4$)). Namely, Pt:KI=1:25 in molar ratio.

The hydrogen reduction step was carried out by blowing hydrogen gas into this mixture for a predetermined time (10 minutes) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was golden-color. The color of the colloidal liquid depends on the size of the platinum nanoparticles. Next, samples were prepared by casting several drops of the colloidal solution in grids, and the shapes and the particle diameters of the platinum nanoparticles of the prepared samples were observed with a transmission electron microscope (TEM, manufactured by JEOL Ltd., type JEM-2000EX). The particle diameter was based on the standard size in the TEM photograph. FIG. 1 shows examples of the platinum nanoparticles along with the standard size. As shown, the platinum nanoparticles with cubic or substantially cubic shapes were obtained. The particle diameter was 10 nm or less, and, in particular, as fine as about 3 through 8 nm or about 4 through 6 nm. The platinum nanoparticles are estimated to be single crystals.

In addition, as is understood from FIG. 1, the aggregation degree of a plurality of platinum nanoparticles was very low, and a large number of platinum nanoparticles with polyhedral shapes (cubic shapes) existed independently of each other. Therefore, it is considered that when used as electrode catalysts in membrane electrode assemblies of fuel cells, etc., the catalytic performance is improved thereby.

In the present embodiment, PAA exhibiting a high viscosity is not used as the capping reagent and the aggregation inhibitor. Therefore, the cleaning treatment can be made simple, and the cleaning costs can be reduced. It is considered that the polyhedral platinum particles can be obtained without using PAA by virtue of the influence of potassium ions as the cations (positive ions) of the iodide. In this case, the reason the polyhedral platinum nanoparticles with a low aggregation degree are obtained even if PAA is not contained has not been sufficiently clarified, but, as described above, this is probably because anions are adsorbed on specific crystal faces of nuclei of the platinum nanoparticles, and cations (positive ions) are adsorbed on peripheries of the anions, thereby promoting the growth of the other specific crystal faces thereof.

In addition, with the present embodiment, problems caused by the residue of PAA exhibiting a high viscosity in the platinum nanoparticles can be restrained, whereby the present embodiment is advantageous in enhancing the recovery rate of the polyhedral platinum particles, and ensuring the inherent performance of the platinum nanoparticles, such as good catalytic performance, etc.

In the present embodiment, the reason the polyhedral platinum nanoparticles with cubic or substantially cubic shapes are obtained has not been sufficiently clarified, but it is estimated as follows. Namely, when the platinum complex ions are subjected to the hydrogen reduction, nuclei of the platinum nanoparticles are formed. It is considered that the nuclei of the platinum nanoparticles normally have a polyhedral structure (14-hedral body) that is most stable in surface energy. In this case, it is considered that the 14-hedral body has a surface structure in which (100) faces and (111) faces are combined with each other. It is considered that when halogen compounds such as a halide of alkali metals exist during the growth of the nuclei of the platinum nanoparticles, the surface free energy in the (100) faces of platinum further lowers to restrain the surface growth therein, whereas the surface growth occurs in the direction of the <111> axis, and as a result, polyhedral platinum nanoparticles with cubic shapes, each being defined with (100) faces, are preferentially formed.

Platinum is considered to have a cubic system (face-centered cubic structure, fcc structure). It is considered that in the (100) face, atoms are arranged with a low density, as compared with the (111) face so that the surface energy is higher, and the performance such as catalytic activity, etc is higher. When the platinum nonoparticle composes a cubic body, all surfaces thereof are defined with the (100) faces. Therefore, the polyhedral platinum nanoparticles with cubic shapes are considered to exhibit good performance such as catalytic activity, etc., as compared with those of other shapes such as a spherical shape.

Embodiment 2

Figure 2:
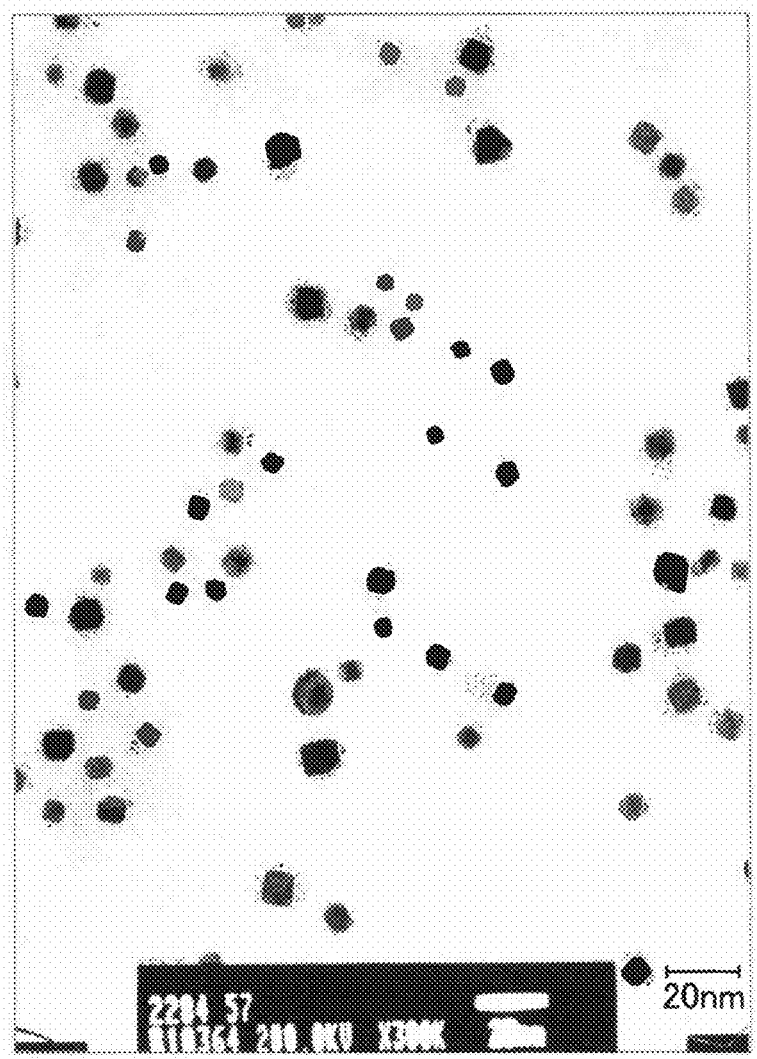
FIG. 2 is an electron microscope photograph of platinum nanoparticles in a second embodiment of a method for producing platinum nanoparticles, in which PAA is not used.

The present embodiment is basically equal to Embodiment 1, and no PAA is used. Rubidium iodide (RbI) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. This mixture does not contain PAA. The number of moles of rubidium iodide (RbI, iodie of alkali metal) is 25 times that of the platinum complex. The hydrogen reduction step was carried out by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually (golden color). In addition, the shapes and the particle diameters of the platinum nanoparticles were observed with the above-described transmission electron microscope (TEM). FIG. 2 shows examples of platinum nanoparticles along with the standard size. As shown, the platinum nanoparticles with polyhedral shapes were obtained. Many particles had diameters of 15 nm or less, respectively, and in particular, 10 nm or less. More specifically, they had diameters of about 5 to 15 nm, or as small as about 5 to 10 m. And as is understood from FIG. 2, the aggregation degree of a plurality of platinum nanoparticles was very low, and a large number of platinum nanoparticles with polyhedral shapes (cubic shapes) existed independently of each other in a high rate.

In the present embodiment, expensive PAA exhibiting a high viscosity is not used as the capping reagent and the aggregation inhibitor. It is considered that the polyhedral platinum particles are obtained without using PAA by virtue of rubidium ions as the cations (positive ions) of the iodide. The reason the polyhedral platinum nanoparticles with a low aggregation degree are obtained even if PAA is not contained has not been sufficiently clarified, but, as described above, this is probably because anions are adsorbed on specific crystal faces of nuclei of the platinum nanoparticles, and cations are adsorbed on peripheries of the anions, thereby promoting the growth of the other specific crystal faces thereof. Therefore, the cleaning treatment can be made simple, and the cleaning costs can be reduced, and consequently, the production costs can be reduced. In addition, with the present embodiment, problems caused by the residue of PAA exhibiting a high viscosity in the platinum nanoparticles can be restrained, whereby the present embodiment is advantageous in enhancing the recovery rate of the polyhedral platinum particles, and ensuring the inherent performance of the platinum nanoparticles, such as catalytic performance, etc.

Embodiment 3

Figure 3:
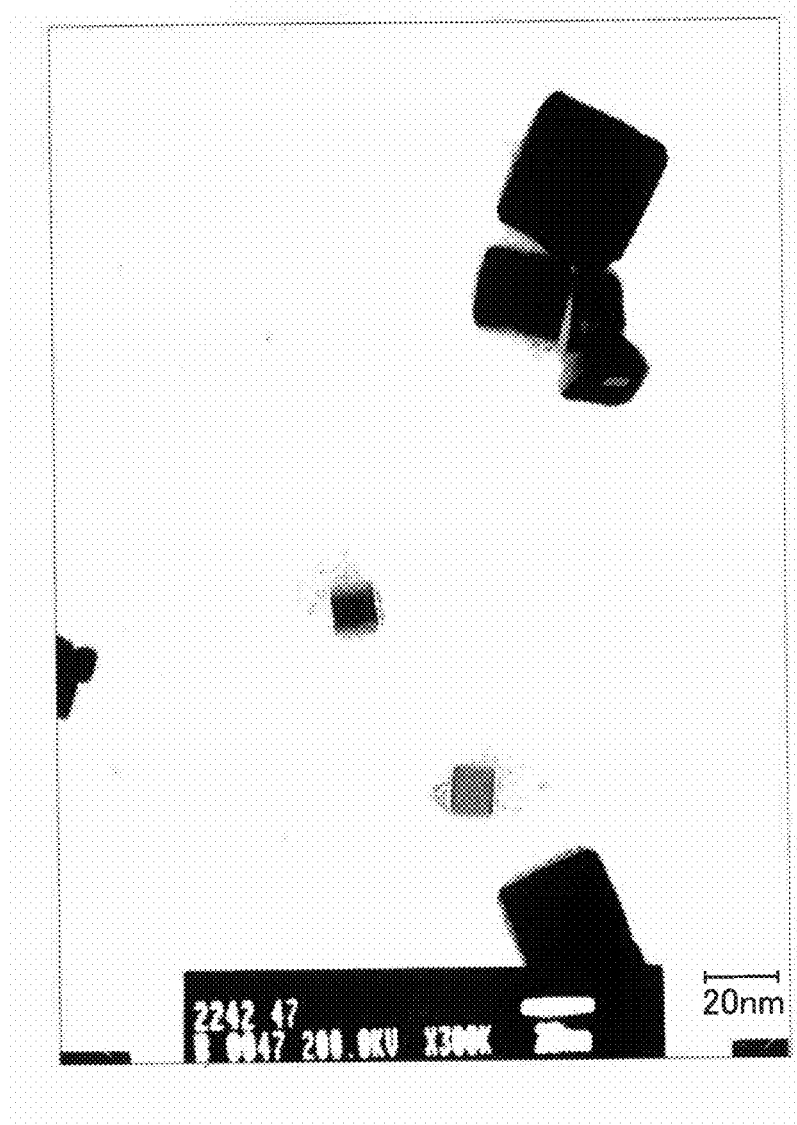
FIG. 3 is an electron microscope photograph of platinum nanoparticles in a third embodiment of a method for producing platinum nanoparticles, in which PAA is not used.

The present embodiment is basically equal to Embodiment 1, and does not use PAA. Caesium iodide (CsI, iodide of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. This mixture does not contain PAA. The number of moles of caesium iodide (CsI) is 25 times that of the platinum complex. The hydrogen reduction step was carried out by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually (golden color). In addition, the shapes and the particle diameters of the platinum nanoparticles were observed with the above-described transmission electron microscope (TEM). FIG. 3 shows examples of the platinum nanoparticles along with the standard size. As shown, the platinum nanoparticles with polyhedral shapes were obtained. Many nanoparticles had diameters of 40 nm or less, and, in particular, 30 nm or less. In addition, as is understood from FIG. 3, there was not observed any aggregation in a plurality of platinum nanoparticles, or if any, the aggregation degree was low.

In the present embodiment, PAA exhibiting a high viscosity is not used as the capping reagent and the aggregation inhibitor. It is considered that the polyhedral platinum particles are obtained without using PAA by virtue of the caesium ions as the cations (positive ions) of the iodide. Therefore, the cleaning treatment can be made simple, and the cleaning costs can be reduced, and consequently, the production costs can be reduced. In addition, with the present embodiment, problems caused by the residue of PAA exhibiting a high viscosity in the platinum nanoparticles can be restrained, whereby the present embodiment is advantageous in enhancing the recovery rate of the polyhedral platinum particles, and ensuring the inherent performance of the platinum nanoparticles, such as catalytic performance, etc.

Embodiment 4

Figure 4:
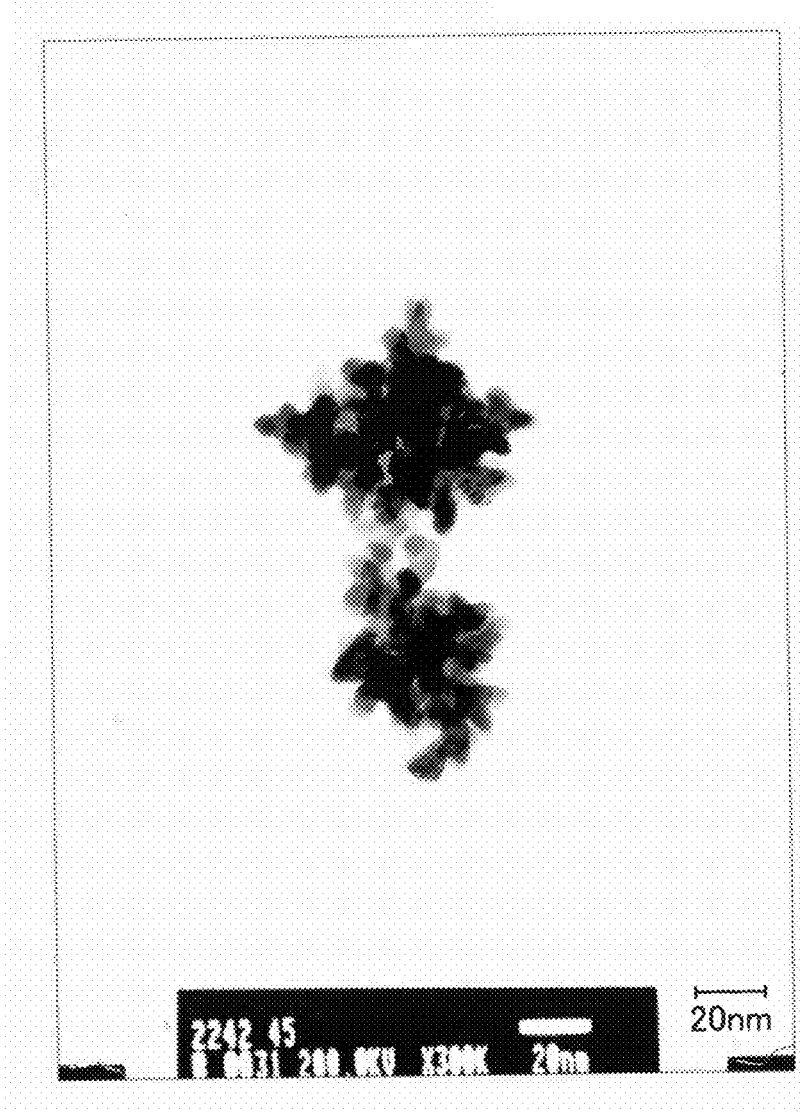
FIG. 4 is an electron microscope photograph of platinum nanoparticles in a fourth embodiment of a method for producing platinum nanoparticles, in which PAA is not used.

The present embodiment is basically equal to Embodiment 1, and does not use PAA. Lithium iodide (LII, iodide of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. This mixture does not contain PAA. The number of moles of Lithium iodide (LiI) is 25 times that of the platinum complex. The hydrogen reduction step was carried out by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually (black). In addition, the shapes and the particle diameters of the platinum nanoparticles were observed with the above-described transmission electron microscope (TEM). FIG. 4 shows examples of the platinum nanoparticles along with the standard size. As shown, the platinum nanoparticles having polyhedral shapes were obtained. The particle diameter of secondary particles caused by the aggregation of a plurality of platinum nanoparticles was about 30 through 60 nm. Therefore, the aggregation degree of the platinum nanoparticles was low. In the present embodiment, PAA was not used as the capping reagent and the aggregation inhibitor, but it is estimated that the aggregation properties of the platinum nanoparticles are lowered with the increment of the concentration of lithium iodide (LiI).

In the present embodiment, expensive PAA exhibiting a high viscosity is not used as the capping reagent and the aggregation inhibitor. It is considered that the polyhedral platinum particles are obtained without using PAA by virtue of lithium ions as the cations (positive ions) of the iodide. Therefore, the cleaning treatment can be made simple, and the cleaning costs can be reduced, and consequently, the production costs can be reduced. In addition, with the present embodiment, problems caused by the residue of PAA exhibiting a high viscosity in the platinum nanoparticles can be restrained, whereby the present embodiment is advantageous in enhancing the recovery rate of the polyhedral platinum particles, and ensuring the inherent performance of the platinum nanoparticles, such as catalytic performance, etc.

Embodiment 5

Figure 5:
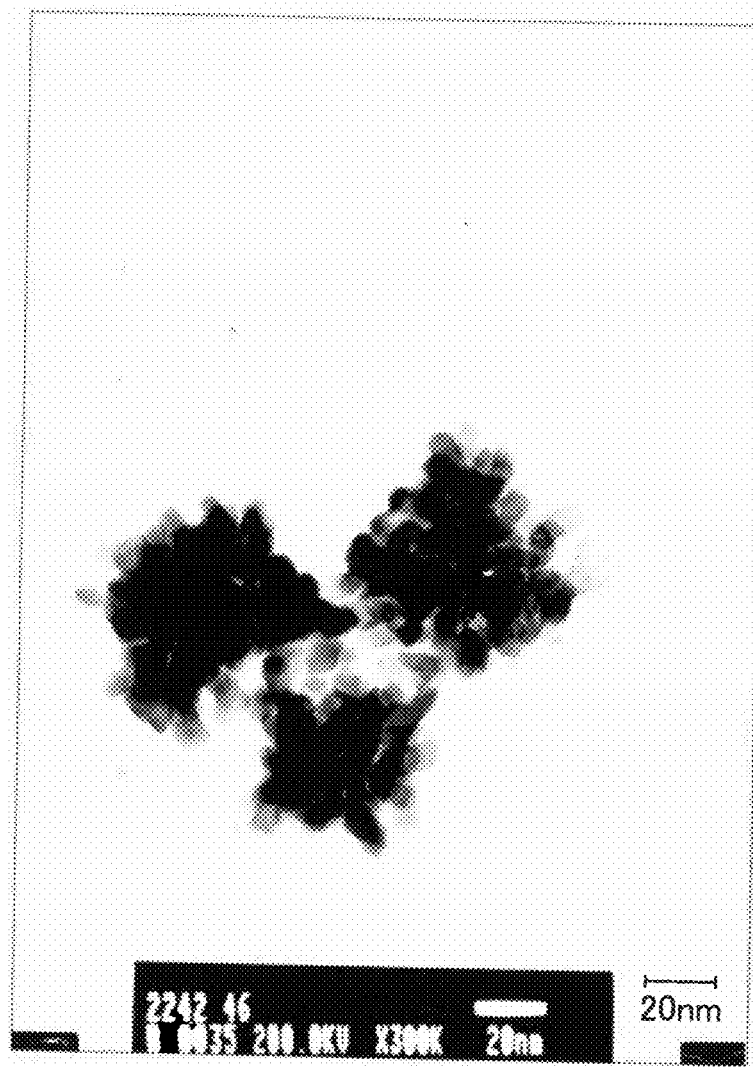
FIG. 5 is an electron microscope photograph of platinum nanoparticles in a fifth embodiment of a method for producing platinum nanoparticles, in which PAA is not used.

The present embodiment is basically equal to Embodiment 1, and does not use PAA. Sodium iodide (NaI, iodide of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. This mixture does not contain PAA. The number of moles of sodium iodide (NaI) is 25 times that of the platinum complex. The hydrogen reduction step was carried out by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually (black). In addition, the shapes and the particle diameters of the platinum nanoparticles were observed with the above-described transmission electron microscope (TEM). FIG. 5 shows examples of the platinum nanoparticles along with the standard size. As shown, the platinum nanoparticles with polyhedral shapes were obtained. The particle diameter of secondary particles caused by the aggregation of a plurality of platinum nanoparticles was about 30 through 50 nm. Therefore, the aggregation degree of the platinum particles was low. In the present embodiment, PAA was not used as the capping reagent and the aggregation inhibitor, but it is estimated that the aggregation properties of the platinum nanoparticles are lowered with the increment of the concentration of sodium iodide (LiI).

In the present embodiment, PAA exhibiting a high viscosity is not used as the capping reagent and the aggregation inhibitor. It is considered that by virtue of the cations (positive ions) of the iodide, the platinum nanoparticles can be formed without using PAA. Therefore, the cleaning treatment can be made simple, and the cleaning costs can be reduced, whereby the production costs can be reduced. In addition, with the present embodiment, problems caused by the residue of PAA exhibiting a high viscosity in the platinum nanoparticles can be restrained, whereby the present embodiment is advantageous in enhancing the recovery rate of the polyhedral platinum particles, and ensuring the inherent performance of the platinum nanoparticles, such as catalytic performance, etc.

Evaluation of Embodiments 1 through 5

In accordance with the above-described embodiments 1 through 5, platinum nanoparticles with polyhedral shapes (cubic type), small particle diameters, and low aggregation degrees were able to be produced by using iodides without using PAA. In particular, in accordance with the embodiments 1 through 3, the platinum nanoparticles with cubic type polyhedral shapes, small particle diameters, and low aggregation degrees were able to be produced. Namely, with the embodiments 1 through 3, in which iodides having positive ions (cations) with ion radiuses greater than those of potassium ions were adopted, platinum nanoparticles with cubic type polyhedral shapes, and low aggregation degrees were able to be favorably produced.

COMPARATIVE EXAMPLE 1

Comparative example 1 using PAA will be explained. The comparative example is basically common to Embodiment 1. But, PAA is used. PAA was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. The atmosphere was air atmosphere. This mixture contains PAA. PAA added has a mole number that is 25 times as large as that of platinum complex (that of the potassium tetrachloroplatinate ($K_2PtCl_4$)). Namely, Pt:PAA=1:25 in molar ratio.

And, the hydrogen reduction step was carried out by blowing hydrogen gas into this mixture for a predetermined time (10 min) under the condition of 300 ml/min, thereby bubbling the same, similarly to Embodiment 1. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope (TEM), similarly to Embodiment 1. Polyhedral platinum nanoparticles with cubic or substantially cubic shapes were obtained.

In this comparative example, a large amount of PAA exhibiting a high viscosity was used. In addition, problems caused by the PAA exhibiting a high viscosity occur in the cleaning treatment, whereby the cleaning costs are increased, and there is a limit of the enhancement of the recovery rate of the platinum nanoparticles, as is different from the embodiments. Furthermore, PAA exhibiting a high viscosity may remain in the platinum nanoparticles so that this example is less preferable for ensuring the inherent performance of the platinum nanoparticles, such as catalytic performance.

Embodiment 6

Embodiment 6 of the present invention, which uses no PAA, will be explained. Potassium chloride (KCl, chloride of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. The atmosphere was determined to be air atmosphere. This mixture does not contain PAA. Potassium chloride (KCl) to be added has a mole number that is 25 times as large as that of the platinum complex (potassium tetrachloroplatinate ($K_2PtCl_4$)). Namely, Pt KCl=1:25 in molar ratio.

Figure 6:
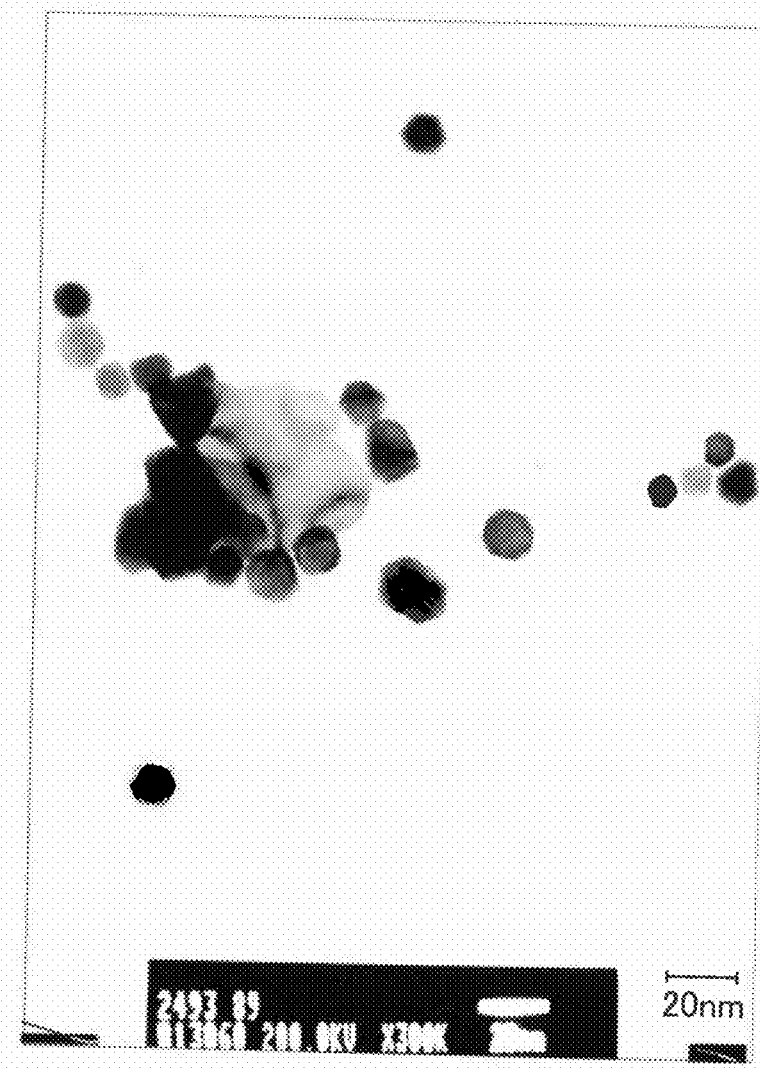
FIG. 6 is an electron microscope photograph of platinum nanoparticles in a sixth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope (TEM). FIG. 6 shows examples of the platinum nanoparticles of the present embodiment along with the standard size. As shown, the platinum nanoparticles with polyhedral (14-hedral) shapes were obtained. The particle diameter was 10 nm or less, and in particular, as fine as about 7 through 8 nm. The aggregation degree of the platinum particles was low.

In the present embodiment, PAA exhibiting a high viscosity was not used so that problems caused by the residue of PAA can be restrained, whereby the present embodiment is advantageous in enhancing the recovery rate of the polyhedral platinum particles, and ensuring the inherent performance of the platinum nanoparticles, such as catalytic performance, etc.

Embodiment 7

Embodiment 7 of the present invention, which does not use PAA, will be explained. Sodium chloride (NaCl, chloride of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. The atmosphere was determined to be air atmosphere. This mixture does not contain PAA. Sodium chloride (NaCl) has a mole number that is 25 times as large as that of the platinum complex (potassium tetrachloroplatinate ($K_2PtCl_4$)). Namely the molar ratio thereof is: Pt:NaCl=1:25.

Figure 7:
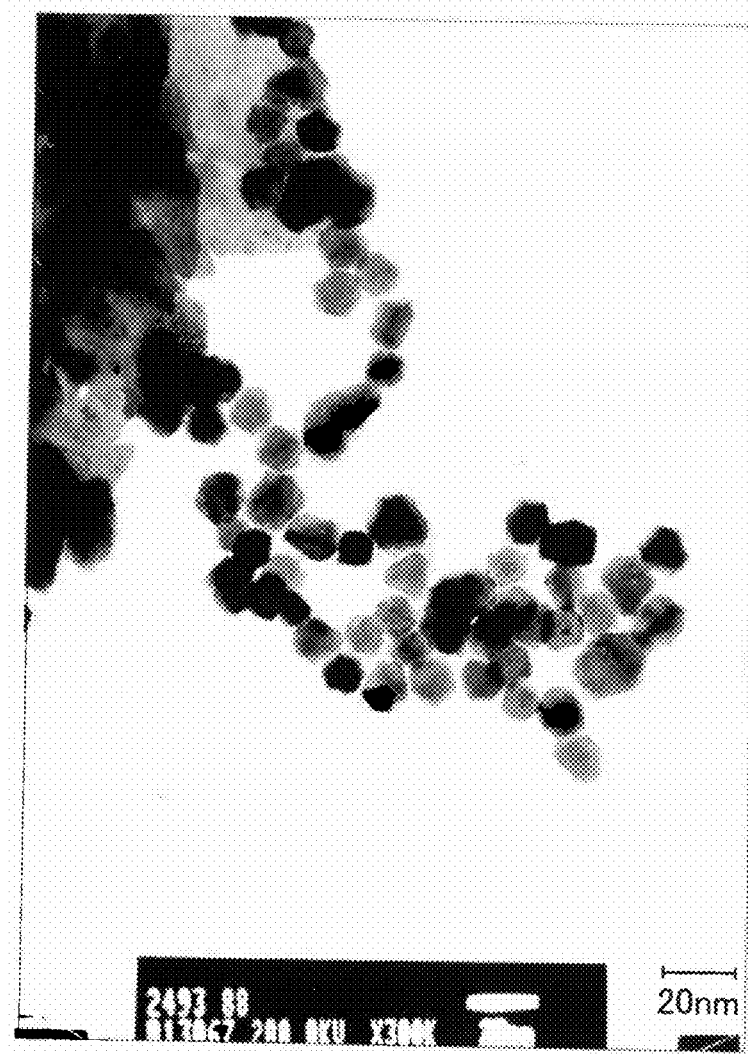
FIG. 7 is an electron microscope photograph of platinum nanoparticles in a seventh embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope. FIG. 7 shows examples of the platinum nanoparticles of the present embodiment along with the standard size. As shown, the platinum nanoparticles with polyhedral shapes were obtained. The particle diameter was 20 nm or less, and, in particular, as fine as about 7 through 15 nm. The aggregation degree of the platinum nanoparticles was low, too. In the present embodiment, PAA exhibiting a high viscosity is not used so that problems caused by the residue of PAA in the platinum nanoparticles can be restrained, whereby the present embodiment is advantageous in enhancing the recovery rate of the polyhedral platinum particles, and ensuring the inherent performance of the platinum nanoparticles, such as catalytic performance, etc.

Embodiment 8

Embodiment 8 of the present invention, which does not use PAA, will be explained. Rubidium chloride (RbCl, chloride of alkali metal) was added to a predetermined volume (300 cc) of a solution of potassium tetrachloroplatinate ($K_2PtCl_4$) (temperature: room temperature) with a concentration of $1 \times 10^{-4}$ M, thereby preparing a mixture. The atmosphere was determined to be air atmosphere. This mixture does not contain PAA. Rubidium chloride (RbCl) added has a mole number that is 25 times as large as that of the platinum complex (potassium tetrachloroplatinate ($K_2PtCl_4$)). Namely, Pt:RbCl=1:25 in molar ratio.

Figure 8:
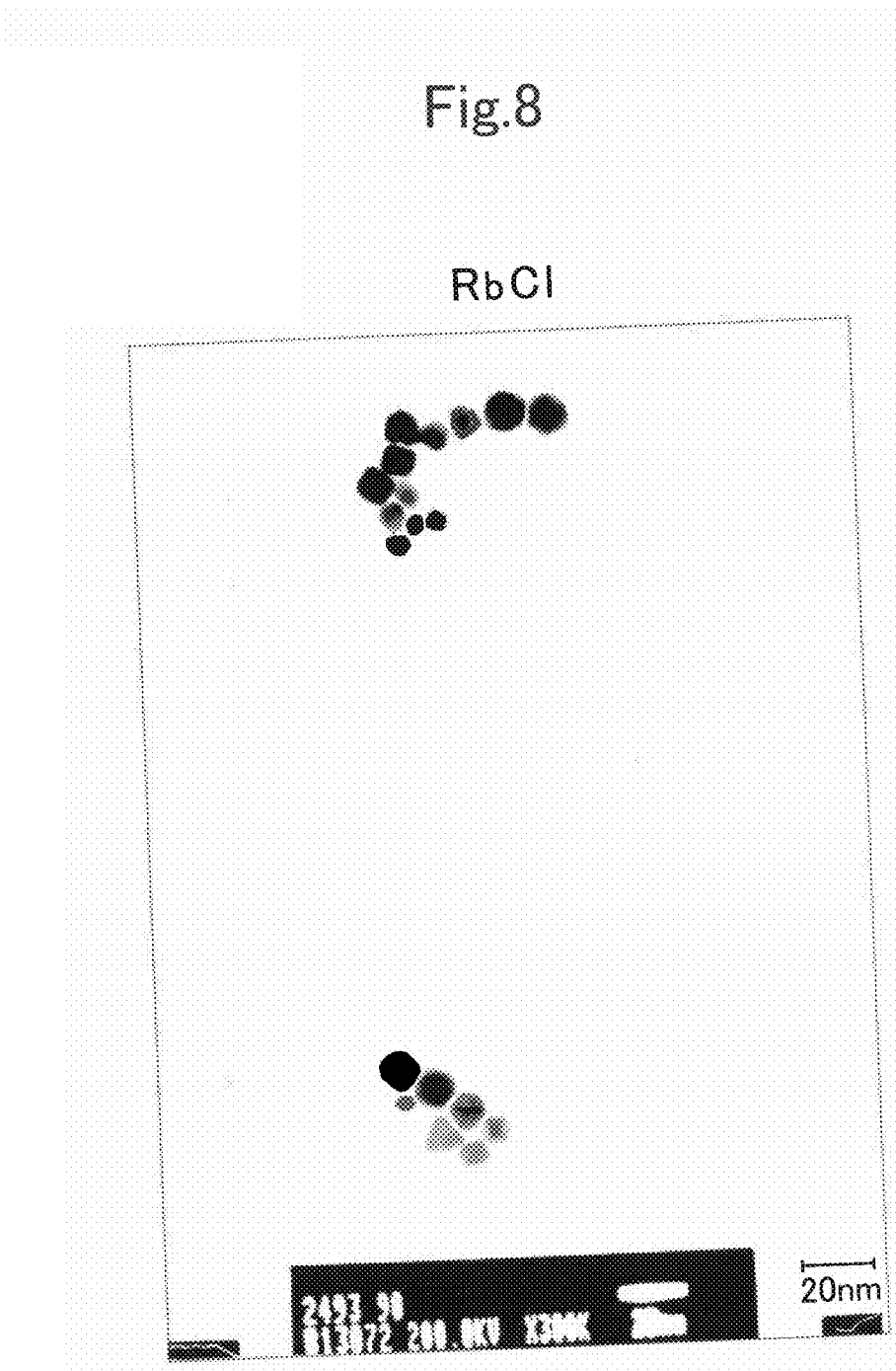
FIG. 8 is an electron microscope photograph of platinum nanoparticles in a eighth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope. FIG. 8 shows examples of the platinum nanoparticles of the present embodiment along with the standard size. As shown, the platinum nanoparticles with polyhedral (probably, 14-hedral) shapes were obtained. The particle diameter was 10 nm or less, and, in particular, as fine as about 7 through 8 nm. The aggregation degree of the platinum nanoparticles was low, too.

In the present embodiment, PAA exhibiting a high viscosity is not used so that problems caused by the residue of PAA in the platinum nanoparticles can be restrained, whereby the cleaning costs in the cleaning treatment can be reduced, and the present embodiment is advantageous in enhancing the recovery rate of the polyhedral platinum particles, and ensuring the inherent performance of the platinum nanoparticles, such as catalytic performance, etc.

Embodiment 9

Embodiment 9 of the present invention, which does not use PAA, will be explained. Lithium chloride (LiCl, chloride of alkali metal) was added to a predetermined volume (300 cc) of a solution of potassium tetrachloroplatinate ($K_2PtCl_4$, complex compound) (temperature: room temperature) with a concentration of $1 \times 10^{-4}$ M, thereby preparing a mixture. The atmosphere was determined to be air atmosphere. This mixture does not contain PAA. Lithium chloride (LiCl) has a mole number that is 25 times as large as that of the platinum complex (potassium tetrachloroplatinate ($K_2PtCl_4$)). Namely, Pt:LiCl=1:25 in molar ratio.

Figure 9:
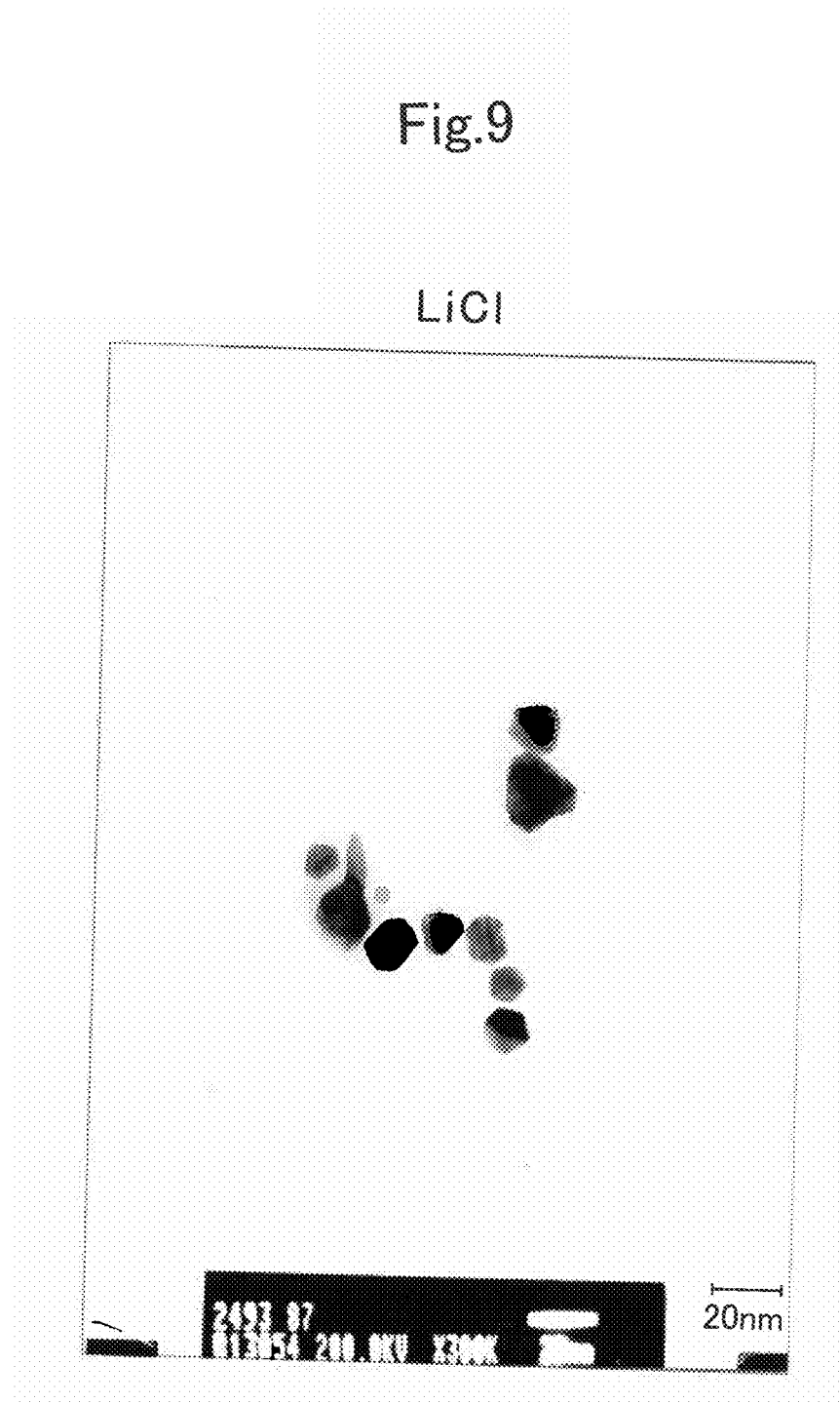
FIG. 9 is an electron microscope photograph of platinum nanoparticles in a ninth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope. FIG. 9 shows the platinum nanoparticles of the present embodiment along with the standard size. As shown, the platinum nanoparticles with polyhedral (probably, 14-hedral) shapes were obtained. The particle diameter was 20 nm or less, and, in particular, as fine as about 6 through 15 nm. The aggregation degree of the platinum nanoparticles was low, too.

In the present embodiment, expensive PAA exhibiting a high viscosity is not used as the capping reagent and the aggregation inhibitor. Therefore, the cleaning treatment can be made simple, and the cleaning costs can be reduced, whereby the production costs can be reduced. And the recovery rate of the polyhedral platinum particles can be enhanced.

Figure 10:
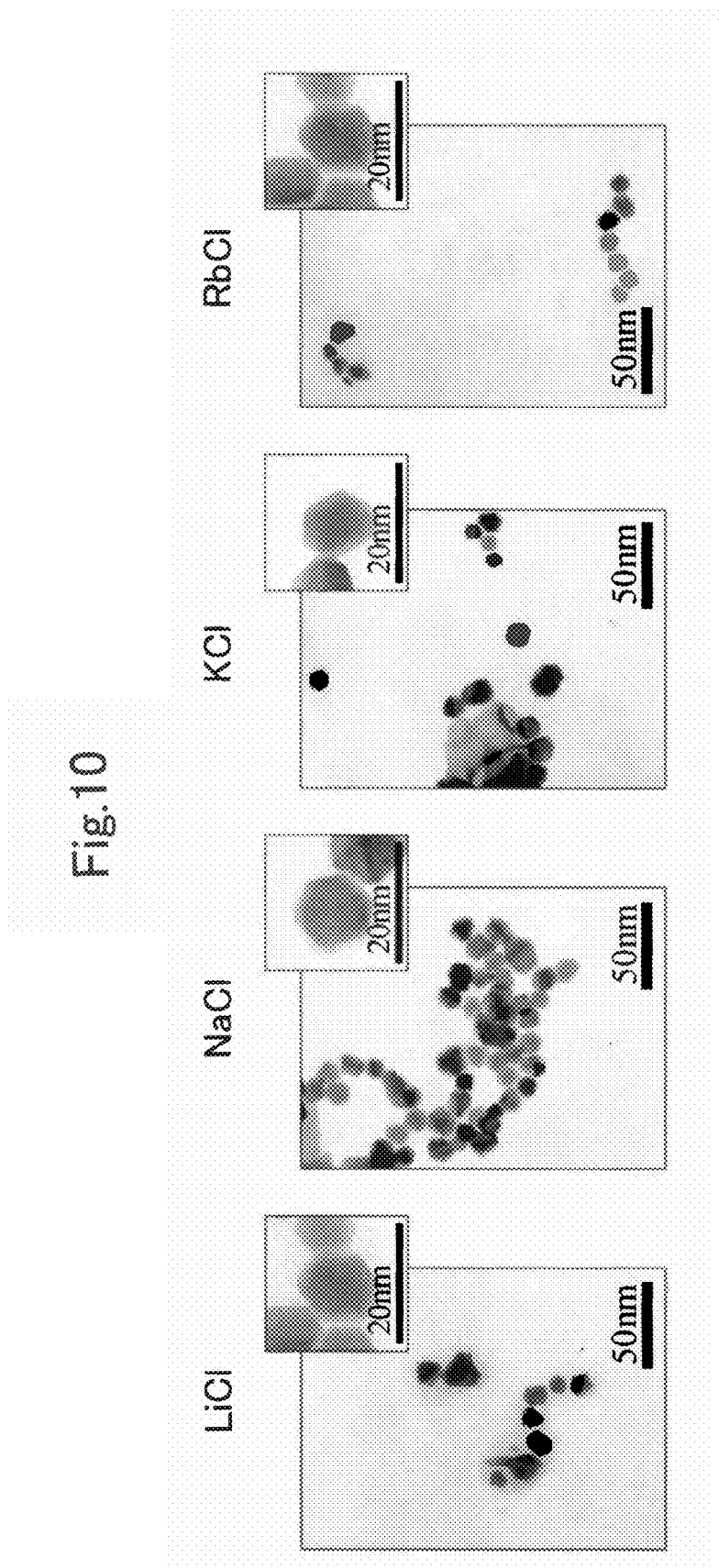
FIG. 10 are electron microscope photographs of platinum nanoparticles formed in sixth through ninth embodiments, in which PAA is not used.

FIG. 10 shows TEM photographs of platinum particles produced in Embodiments 6 through 9 using chlorides of alkali metals. The standard size is 50 nm and 20 nm.

Embodiment 10

Embodiment 10 of the present invention, which does not use PAA, will be explained. Potassium bromide (KBr, bromide of alkali metal) was added to a predetermined volume (300 cc) of a solution of potassium tetrachloroplatinate ($K_2PtCl_4$) (temperature: room temperature) with a concentration of $1\times10^{-4}$ M, thereby preparing a mixture. The atmosphere was determined to be air atmosphere. This mixture does not contain PAA. The number of moles of potassium bromide (KBr) is 25 times that of the platinum complex (potassium tetrachloroplatinate ($K_2PtCl_4$)). Namely, Pt:KBr=1:25 in molar ratio.

Figure 11:
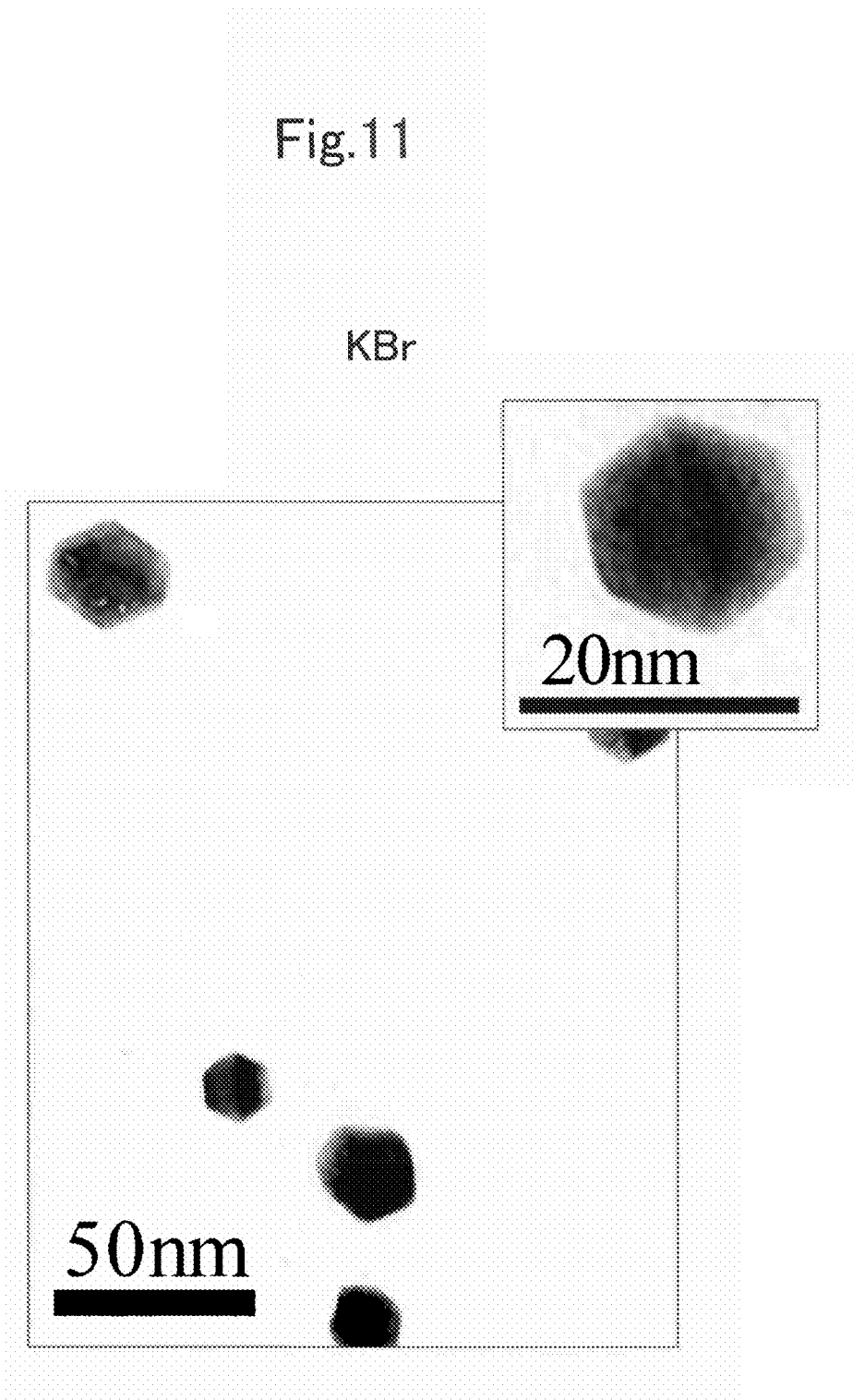
FIG. 11 is an electron microscope photograph of platinum nanoparticles in a tenth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope. FIG. 11 shows examples of the platinum nanoparticles of the present embodiment along with the standard size. As shown, the platinum nanoparticles with polyhedral (probably 14-hedral) shapes were obtained. The particle diameter was 50 nm or less, and, in particular, as small as about 18 through 30 nm. The aggregation degree of the platinum particles was low, too.

In the present embodiment, PAA exhibiting a high viscosity is not used so that problems caused by the residue of PAA in the platinum nanoparticles can be restrained, whereby the present embodiment is advantageous in enhancing the recovery rate of the polyhedral platinum particles, and enduring the inherent performance of the platinum nanoparticles, such as catalytic performance, etc.

Embodiment 11

Embodiment 11 of the present invention, which does not use PAA, will be explained. Sodium bromide (NaBr, bromide of alkali metal) was added to a predetermined volume (300 cc) of a solution of potassium tetrachloroplatinate ($K_2PtCl_4$) (temperature: room temperature) with a concentration of $1\times10^{-4}$ M, thereby preparing a mixture. The atmosphere was determined to be air atmosphere. This mixture does not contain PAA. The number of moles of sodium bromide (NaBr) added is 25 times that of the platinum complex (potassium tetrachloroplatinate ($K_2PtCl_4$)). Namely, Pt:NaBr=1:25 in molar ratio.

Figure 12:
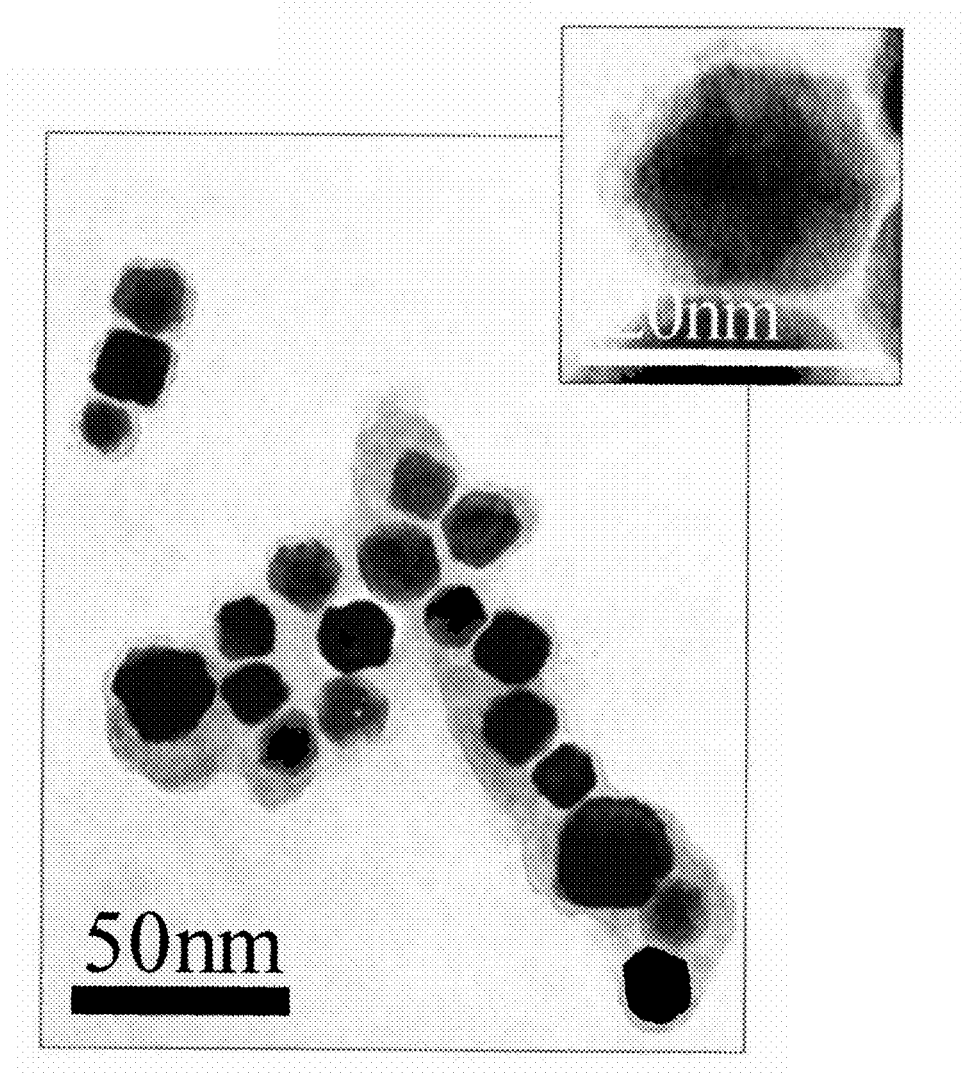
FIG. 12 is an electron microscope photograph of platinum nanoparticles in an eleventh embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the above-described transmission electron microscope. FIG. 12 shows examples of the platinum nanoparticles of the present embodiment along with the standard size. As shown, the platinum nanoparticles with polyhedral shapes were obtained. The particle diameter was 40 nm or less, and, in particular, as fine as about 10 through 30 nm. The aggregation degree of the platinum nanoparticles was low, too. In the present embodiment, PAA exhibiting a high viscosity is not used so that problems caused by the residue of PAA in the platinum nanoparticles can be restrained, whereby the present embodiment is advantageous in enhancing the recovery rate of the polyhedral platinum particles, and enduring the inherent performance of the platinum nanoparticles, such as catalytic performance, etc.

Embodiment 12

Embodiment 12 of the present invention, which does not use PAA, will be explained. Rubidium bromide (RbBr, bromide of alkali metal) was added to a predetermined volume (300 cc) of a solution of potassium tetrachloroplatinate ($K_2PtCl_4$) (temperature: room temperature) with a concentration of $1\times10^{-4}$ M, thereby preparing a mixture. The atmosphere was determined to be air atmosphere. This mixture does not contain PAA. The number of moles of rubidium bromide (RbBr) added is 25 times that of the platinum complex (potassium tetrachloroplatinate ($K_2PtCl_4$)). Namely, Pt:RbBr=1:25 in molar ratio.

Figure 13:
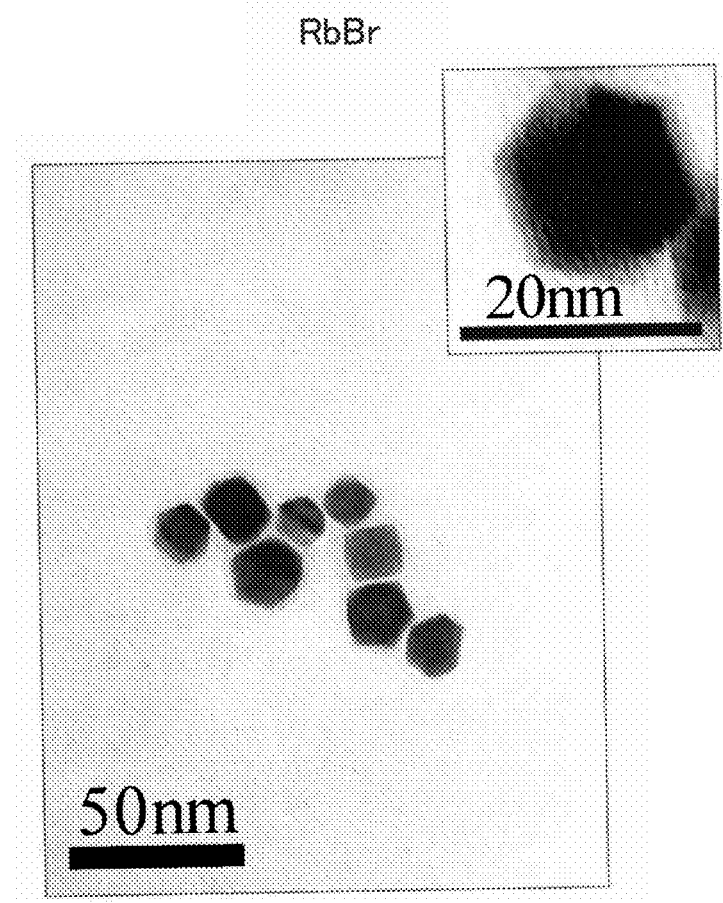
FIG. 13 is an electron microscope photograph of platinum nanoparticles in a twelfth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same. Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the transmission electron microscope. FIG. 13 shows examples of the platinum nanoparticles of the present embodiment along with the standard size. As shown, the platinum nanoparticles with polyhedral (probably 14-hedral) shapes were obtained. The particle diameter was 30 nm or less, and, in particular, as fine as about 10 through 30 nm. The aggregation degree of the platinum particles was low, too.

In the present embodiment, PAA exhibiting a high viscosity is not used so that problems caused by the residue of PAA in the platinum nanoparticles can be restrained, whereby the cleaning costs in the cleaning treatment can be reduced, and the present embodiment is advantageous in enhancing the recovery rate of the polyhedral platinum particles, and enduring the inherent performance of the platinum nanoparticles, such as catalytic performance, etc.

Embodiment 13

Embodiment 13 of the present invention, which does not use PAA, will be explained. Lithium bromide (LiBr, bromide of alkali metal) was added to a predetermined volume (300 cc) of a solution of potassium tetrachloroplatinate ($K_2PtCl_4$) (temperature: room temperature) with a concentration of $1\times10^{-4}$ M, thereby preparing a mixture. The atmosphere was determined to be air atmosphere. This mixture does not contain PAA. The number of moles of lithium bromide (LIBr) added is 25 times that of the platinum complex (potassium tetrachloroplatinate ($K_2PtCl_4$)). Namely, Pt:LiBr=1:25 in molar ratio.

Figure 14:
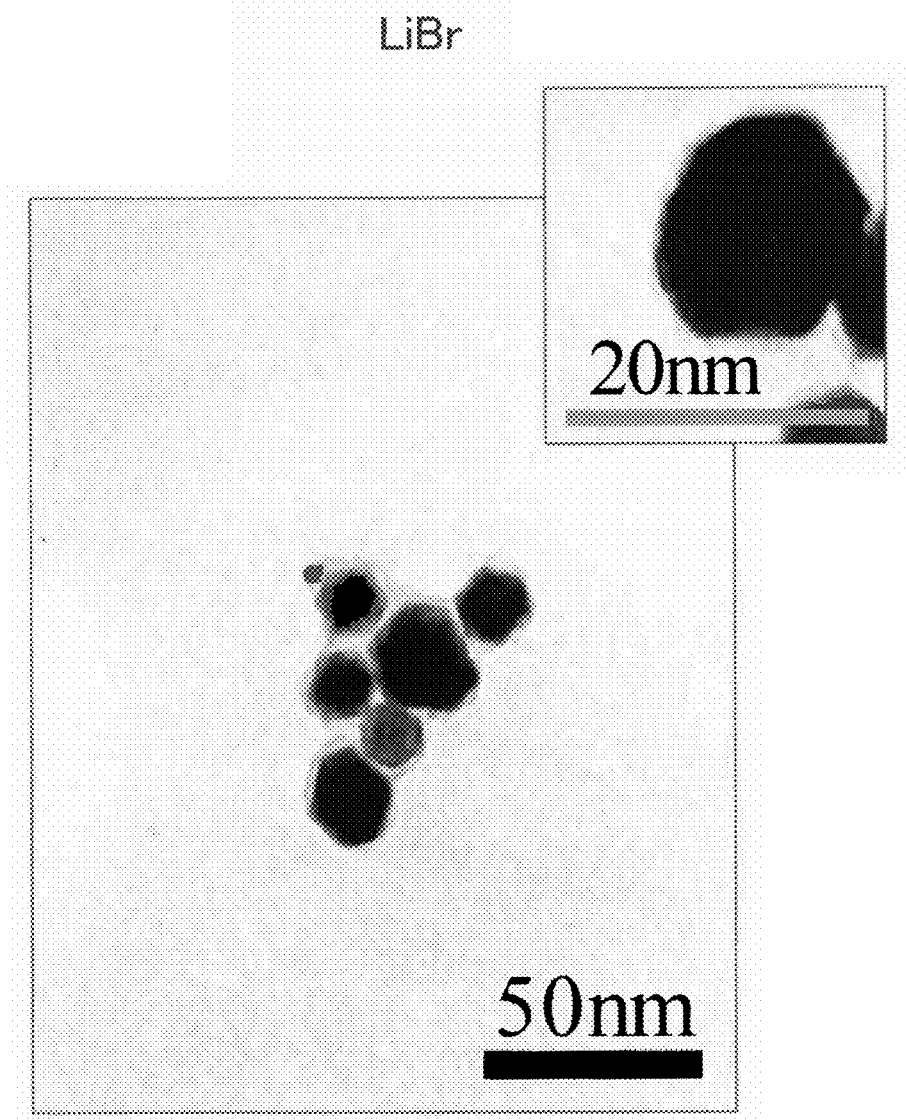
FIG. 14 is an electron microscope photograph (TEM) of platinum nanoparticles in a thirteenth embodiment of a method for producing platinum nanoparticles, in which PAA is not used.

The hydrogen reduction step was carried out, similarly to Embodiment 1, by blowing hydrogen gas into this mixture for a predetermined time (10 min) under the condition of 300 ml/min, thereby bubbling the same, Then, the holding step was carried out by allowing this mixture to stand for a whole day and night (10 hours) in a tightly sealed state, thereby forming a colloidal solution containing platinum nanoparticles. The color of the colloidal solution was observed visually. The color was black. In addition, the shapes and the particle diameters of the platinum nanoparticles were observed with the transmission electron microscope. FIG. 14 shows the platinum nanoparticles of the present embodiment along with the standard size. As shown, the platinum nanoparticles with polyhedral (probably 14-hedral) shapes were obtained. The particle diameter was 40 nm or less, and, in particular, as fine as about 6 through 30 nm. The aggregation degree of the platinum nanoparticles was low, too.

In the present embodiment, expensive PAA exhibiting a high viscosity is not used as the capping reagent and the aggregation inhibitor. Therefore, the cleaning treatment can be made simple, and the cleaning costs can be reduced, whereby the production costs can be reduced. And the recovery rate of the polyhedral platinum particles can be enhanced.

[Others]

The above-described embodiments 1 through 13 have adopted a predetermined volume (300 cc) of a solution of potassium tetrachloroplatinate ($K_2PtCl_4$, complex compound) with a concentration of $1\times10^{-4}$ M. The concentration of potassium tetrachloroplatinate along with the volume thereof are not limited to these values. For example, the concentration of the potassium tetrachloroplatinate may be ranged from $1\times10^{-7}$ to $1\times10^{-1}$, from $1\times10^{-6}$ to $1\times10^{-2}$, or from $1\times10^{-5}$ to $1\times10^{-3}$ M, and is not limited to these ranges. According to requirements, ultrasonic wave vibrations may be input in the mixture or the solution of potassium tetrachloroplatinate ($K_2PtCl_4$). In the hydrogen reduction step, bubbling was carried out by blowing hydrogen gas into the mixture under the condition of 300 ml/min for 10 min. The flow rate of hydrogen gas is not limited to this flow rate, and can be changed to 50 through 3000 ml/min, for example, according to factors such as the volume of the mixture, etc. The blowing time is not limited to 10 min, and can be arbitrarily changed to 5 min, 20 min, 40 min, etc.

Hereinafter, Embodiments 1A through 1F, and 2A through 2F according to the third aspect of the present invention, which use PAA, will be explained.

Embodiment 1A

The present embodiment enables the platinum nanoparticles with polyhedral shapes to be efficiently formed and supported on surfaces of a carbon support. First, a predetermined volume (300 cc) of a purified water (dispersion medium), 12.45 mg ($3.0\times10^{-5}$ mol) of potassium tetrachloroplatinate (II) ($K_3PtCl_4$, platinum complex), 249.02 mg ($1.5\times10^{-3}$ mol) of potassium iodide (KI), 5.64 mg ($1.7\times10^{-6}$ mol) of PAA (capping reagent) and 13.67 mg of carbon black (carbon support) were prepared. Carbon black was Ketjen black (manufactured by Lion Corporation, Ketjen EC300JD). The specific surface area of carbon black was 750 to 850 m$^2$ upon measuring with BET method ($N_2$). The weight average molecular weight of PAA was determined to be 3317.65. The measurement was performed with gel permeation chromatography.

With the present embodiment, by dispersing carbon black in a purified water, a dispersion water was formed in air atmosphere (normal temperature). Then, potassium tetrachloroplatinate (II) ($K_3PtCl_4$) was added to the dispersion liquid in air atmosphere (normal temperature). Next, potassium iodide (KI) was added to the dispersion liquid in air atmosphere (normal temperature) to form a first mixture liquid. At last, PAA as a polymer capping reagent was added to the first mixture liquid to form a second mixture liquid in air atmosphere (normal temperature). The above-described mixing steps were carried out with the ultrasonic dispersion of inputting ultrasonic waves to the purified water or the dispersion liquid.

By bubbling hydrogen gas in the second mixture liquid, the reduction treatment was carried out. Bubbling was carried out by blowing hydrogen gas in the second mixture liquid in air atmosphere for a predetermined time (10 min) under the condition of 300 ml/min.

Next, the holding step was carried out by allowing the second mixture liquid to stand for a whole day and night (10 hours) in a tightly sealed state, thereby forming a colloidal solution containing carbon black supporting platinum nanoparticles. While filtering the formed colloidal solution, filtered matters were cleaned with a purified water. As a result, an assembly of carbon black particles supporting the platinum nanoparticles was obtained.

The platinum ions are reduced by the reduction with hydrogen gas to form platinum crystals, and consequently, the platinum nanoparticles grow. It is considered that when the platinum nanoparticles grow, the capping reagent caps specific areas of the platinum crystals to restrain the growth thereof, whereas the growth of the other specific areas thereof is promoted, thereby forming platinum nonoparticles with polyhedral shapes, each having surfaces exhibiting high reaction activity.

In the present embodiment, carbon black, potassium tetrachloroplatinate (II), potassium iodide, and PAA are added to the purified water in this order. Where carbon black is represented by CB, potassium tetrachloroplatinate (II) is represented by PT, potassium iodide is represented by KI, sodium polyacrylate is represented by PAA, they are added to the purified water in the order of CB→PT→KI→PAA.

When the molar ratio is expressed relative to the platinum complex (PT) of 1, they are added to the purified water in the order of CB→PT1→KI50→PAA2. "KI50" means that when the molar ratio of PT is expressed by 1, the content of KI corresponds to 50. "PAA2" means that when the molar ratio of PT is expressed by 1, the content of PAA corresponds to 2.

Figure 16:
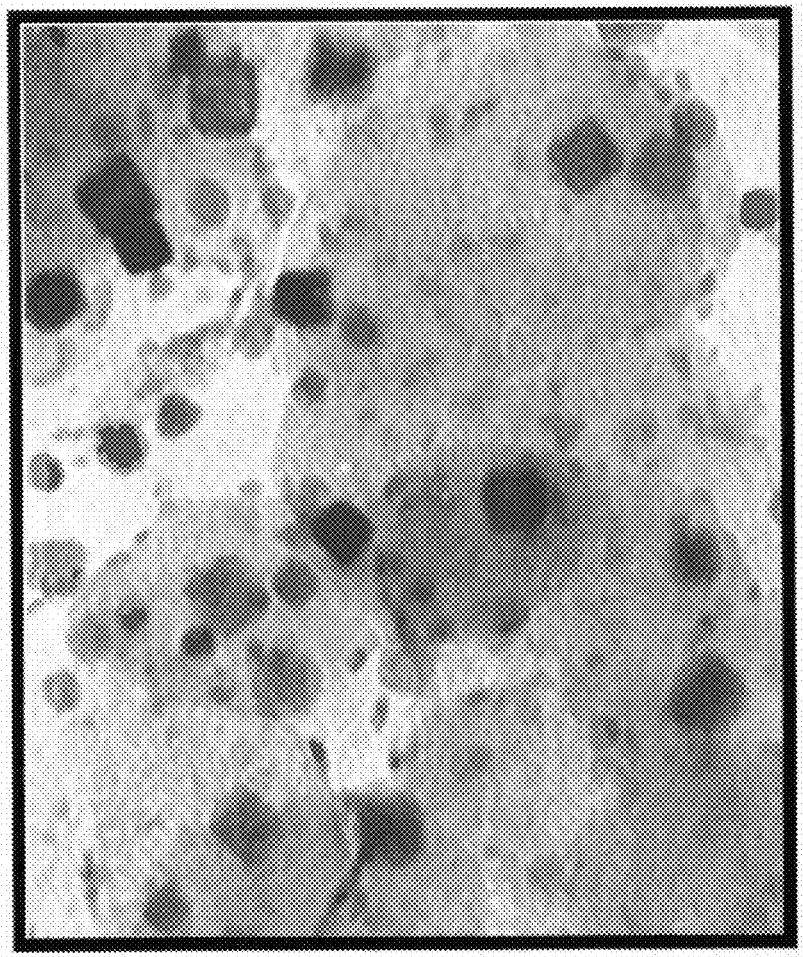
FIG. 16 is an electron microscope photograph of platinum nanoparticles in an embodiment 1A of a method for producing platinum nanoparticles, in which PAA is used.

In addition, samples were prepared by casting several drops of the colloidal solutions in grids, and the shape and the particle diameter of the platinum nanoparticles thereof were observed with a transmission electron microscope (TEM, manufactured by JEOL Ltd. type JEM-2000EX). The particle diameter was based on the standard distance in the TEM photograph. FIG. 16 shows examples of the platinum nanoparticles obtained in Embodiment 1A along with the standard size. As shown, the polyhedral platinum nanoparticles with cubic or substantially cubic shapes were supported on surfaces of particles of carbon black. The particle diameter of the platinum nanoparticle was 10 nm or less, and, in particular, as fine as about 7 through 8 nm. The platinum nanoparticles are estimated to be single crystals.

In addition, as is understood from FIG. 16, the aggregation degree of a plurality of platinum nanoparticles was very low, and a large number of platinum nanoparticles with polyhedral shapes (cubic shapes) existed independently of each other. Therefore, it is considered that when the platinum nanoparticles are used as electrode catalysts in membrane electrode assemblies of fuel cells, etc., the catalytic performance is improved thereby.

As described above, with the present embodiment, before carbon black (carbon support) and PAA (capping reagent) are mixed with each other, carbon black and potassium iodide (adsorbent) were previously mixed with each other. With this method, surfaces of particles of carbon black are previously covered with potassium iodide (adsorbent). The present embodiment thus arranged is estimated as follows. Namely, PAA as the capping reagent is restrained from being excessively adsorbed on surfaces of particles of carbon black. Therefore, the capping action of PAA, which acts on specific surfaces of platinum crystals is improved, and consequently, PAA readily achieves its inherent function of contributing to the growth of the specific surfaces of platinum as the capping reagent. Therefore, It is estimated that the platinum nanoparticles with polyhedral shapes can be efficiently formed on the carbon support.

In the present embodiment, the reason the polyhedral platinum particles with cubic or substantially cubic shapes are obtained has not been sufficiently clarified, but is estimated as follows. Namely, with the hydrogen reduction of platinum complex ions, nucleation of platinum nanoparticles occurs. At this time, the nuclei of platinum nanoparticles are considered to normally take a polyhedral structure (14-hedral body) that exhibits the most stable surface energy. 14-hedral body is considered to have a surface structure in which (100) faces and (111) faces are combined with each other. It is considered that when the nuclear growth occurs in the crystals composing the platinum nanoparticles, the capping reagent is selectively adsorbed on (100) faces of the platinum crystals to restrain the face growth thereof, and consequently, the face growth occurs in the direction of <111> axis preferentially, whereby, finally, the platinum nanoparticles with polyhedral shapes, each particle having a cubic shape defined with (100) faces, are formed.

Platinum is considered to have a cubic system (face-centered cubic structure, fcc structure). When the platinum nanoparticle is formed into a cubic body, all faces of the platinum nanoparticle are defined with (100) faces. Therefore, the platinum nanoparticle with a polyhedral (cubic) shape is considered to exhibit good performance such as catalytic activity, etc., as compared with other shapes such as an irregular shape.

With the present embodiment, various materials such as carbon black were mixed with each other by the ultrasonic dispersion of inputting ultrasonic waves in the purified water or the dispersion liquid, etc. Other dispersing means such as mechanical dispersion without inputting ultrasonic waves will do.

Embodiment 2A

The present embodiment is basically similar to Embodiment 1A, but PAA is added. First, a predetermined volume (300 cc) of a purified water (dispersion medium), 12.45 mg ($3.0 \times 10^{-5}$ mol) of potassium tetrachloroplatinate (II) ($K_3PtCl_4$, platinum complex, ionic platinum compound), 249.02 mg ($1.5 \times 10^{-3}$ mol) of potassium iodide (KI), 5.64 mg ($1.7 \times 10^{-6}$ mol) of PAA (weight average molecular weight: 3317.65) and 13.67 mg of carbon black (carbon support) were prepared. In this case, potassium iodide (KI) was divided into two equal parts.

And, by dispersing carbon black in a purified water, a dispersion liquid was formed. Then, half (124.51 mg, $1.5 \times 10^{-5}$ mol) of potassium iodide (KI) was added to the dispersion liquid. Next, potassium tetrachloroplatinate (II) ($K_3PtCl_4$) was added to the dispersion liquid. And remaining half (124.51 mg, $1.5 \times 10^{-5}$ mol) of potassium iodide (KI) was added to the dispersion liquid and dispersed therein, thereby forming a first mixture liquid. At last, PAA was added to the first mixture liquid and dispersed therein, thereby forming a second mixture liquid. Similarly to Embodiment 1A, the above-described dispersion steps were carried out by the ultrasonic dispersion of inputting ultrasonic wave to the purified water or the dispersion liquid.

By bubbling hydrogen gas in the second mixture liquid, the reduction treatment was carried out. Bubbling was carried out by blowing hydrogen gas in the second mixture liquid in air atmosphere for a predetermined time (10 min) under the condition of 300 ml/min.

Next, the hydrogen treatment was carried out by bubbling hydrogen gas in the second mixture liquid. The bubbling step was carried out by blowing hydrogen gas into the second mixture liquid for a predetermined time (10 min) under the condition of 300 ml/min. Then, the second mixture liquid was tightly sealed, and allowed to stand for a whole day and night (10 hours), thereby carrying out the holding step, and consequently forming a colloidal solution containing carbon black that supports platinum nanoparticles. While filtering the colloidal solution, filtered matters were cleaned with a purified water, similarly to Embodiment 1A. As a result, an assembly of carbon black particles supporting the platinum nanoparticles on surfaces thereof was obtained. In this case, platinum ions in potassium tetrachloroplatinate(II) ($K_3PtCl_4$) are reduced using hydrogen gas to grow platinum nanoparticles from formed platinum crystal nuclei.

With the present embodiment, these materials are added to the purified water in the order of carbon black→potassium iodide→potassium tetrachloroplatinate (II)→potassium iodide→PAA. Where carbon black is represented by CB, potassium tetrachloroplatinate (II) as the platinum complex is represented by PT, potassium iodide is represented by KI, and sodium polyacrylate is represented by PAA, they are added to the purified water in the order of CB→KI→PT→KI→PAA. With the present embodiment where the molar ratio is expressed relative to the platinum complex (PT) of 1, they are added to the purified water in the order of CB→KI25→PT1→KI25→PAA2.

In other words, with the present embodiment, in the step of forming a first mixture liquid, potassium iodide (adsorbent) is mixed in the dispersion liquid before and after the mixing time of the platinum compound. Consequently, these materials are sequentially mixed in the order of carbon black (carbon support)→potassium iodide (adsorbent)→potassium tetrachloroplatinate (II) (platinum compound)→potassium iodide (adsorbent)→capping reagent. Therefore, the platinum compound is expected to be sandwiched between potassium iodide as the adsorbent, and thereby, increase the contact area and contact frequency of the adsorbent and the platinum compound.

Upon testing by the present inventors, they have confirmed that potassium iodide has properties of promoting the growth of specific faces of platinum crystals to enable the formation of polyhedral platinum particles (unknown upon filing the present invention). Therefore, it is advantageous in forming the polyhedral platinum particles on surfaces of the carbon support.

Figure 17:
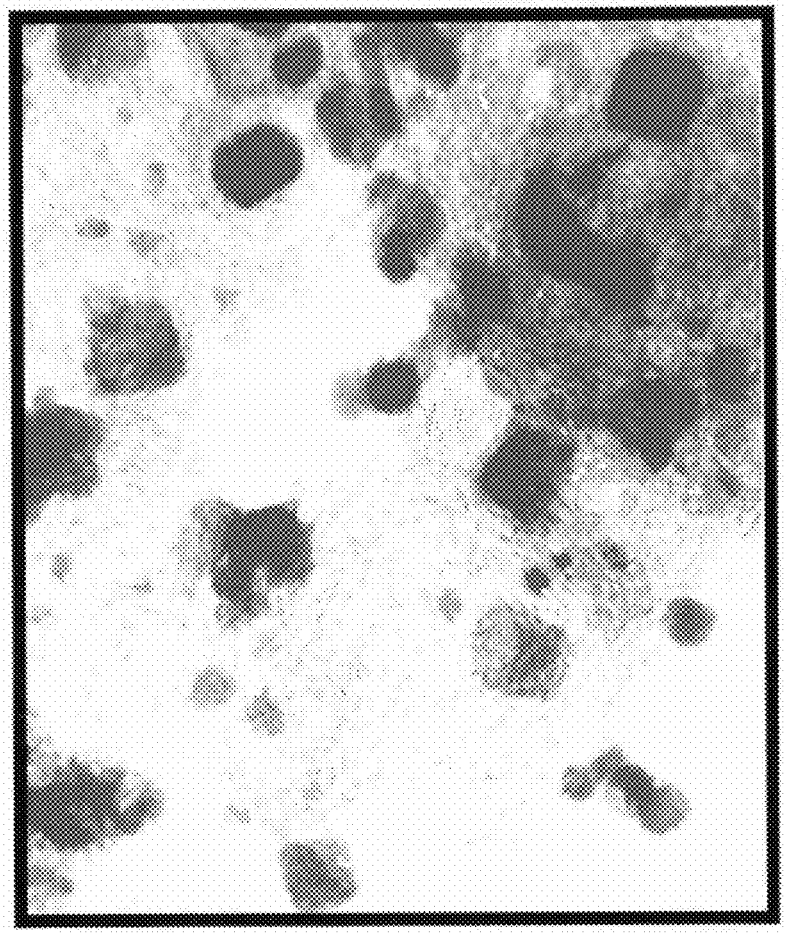
FIG. 17 is an electron microscope photograph (TEM) of platinum nanoparticles in an embodiment 2A of a method for producing platinum nanoparticles, in which PAA is used.

And the shapes and the particle diameters of the platinum nanoparticles of samples prepared by casting several drops of the colloidal solutions in grids were observed with a transmission electron microscope (TEM), similarly to Embodiment 1A. The particle diameter was based on the standard distance in the TEM photograph. FIG. 17 shows examples of the platinum nanoparticles obtained in Embodiment 2A along with the standard size. As shown, the polyhedral platinum nanoparticles with cubic or substantially cubic shapes were supported on surfaces of particles of carbon black. The particle diameters of the platinum nanoparticles were 10 nm or less, and, in particular, as fine as about 7 through 8 nm.

As described above, with the present embodiment, before mixing carbon black and PAA (capping reagent), carbon black and potassium iodide (adsorbent) were mixed with each other so that potassium iodide (adsorbent) was previously adsorbed on surfaces of particles of carbon black. With the present embodiment, PAA that is readily adsorbed on carbon black is restrained from being excessively adsorbed on surfaces of carbon black so that the capping action of PAA, which acts on specific faces of platinum crystals, is improved, and consequently, the platinum nanoparticles with polyhedral shapes can be efficiently formed on the carbon support.

With the present embodiment, the above-described dispersion was carried out by the ultrasonic dispersion of inputting ultrasonic waves in a purified water or a dispersion liquid. Other dispersing means such as mechanical dispersion without inputting ultrasonic waves will do.

COMPARATIVE EXAMPLE 1A

Comparative example 1A in which PAA is added early in the producing steps will be explained. A predetermined volume (300 cc) of a purified water (dispersion medium), 12.45 mg ($3.0 \times 10^{-5}$ mol) of potassium tetrachloroplatinate (II) ($K_3PtCl_4$, complex compound), 249.02 mg ($1.5 \times 10^{-3}$ mol) of potassium iodide (KI), 5.64 mg ($1.7 \times 10^{-6}$ mol) of PAA (capping reagent) and 13.67 mg of carbon black (carbon support) were prepared, similarly to Embodiment 1A. Carbon black was Ketjen black (manufactured by Lion Corporation, Ketjen EC300JD), similarly to Embodiment 1A.

By dispersing potassium tetrachloroplatinate (II) ($K_3PtCl_4$), PAA and potassium iodide (KI) in the purified water in this order, a mixture liquid was formed. At last, carbon black was added to the mixture liquid.

By bubbling hydrogen gas in the mixture liquid, the reduction treatment was carried out. Bubbling was carried out by blowing hydrogen gas in the mixture liquid for a predetermined time (10 min) under the condition of 300 ml/min, similarly to Embodiment 1A. Next, the holding step was carried out by allowing the mixture liquid to stand for a whole day and night (10 hours) in a tightly sealed state, thereby forming a colloidal solution containing carbon black supporting platinum nanoparticles.

In Comparative example 1A, potassium tetrachloroplatinate (II)+PAA+potassium iodide (KI) are added to the purified water at approximately the same time (in the order of PT→PAA→KI). At last, carbon black is added to the mixture liquid. Where carbon black is represented by CB, potassium tetrachloroplatinate (II) is represented by PT, potassium iodide is represented by KI, and sodium polyacrylate is represented by PAA, PT+PAA+KI are added to the purified water at approximately the same time, and carbon black is finally added to the mixture liquid.

In addition, with Comparative example 1A, the molar ratio is expressed as follows relative to the platinum complex (PT) of 1:(PT1+PAA2+KI50)→CB.

Figure 18:
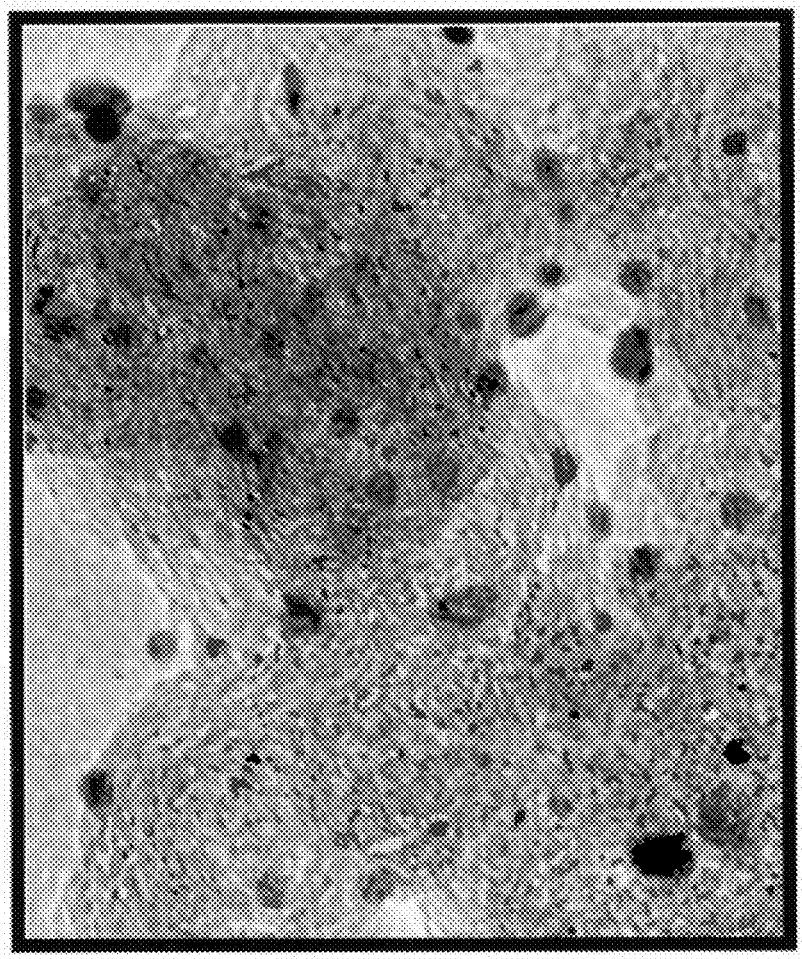
FIG. 18 is an electron microscope photograph of platinum nanoparticles.

Furthermore, the shapes and the particle diameters of the platinum nanoparticles of samples prepared by casting several drops of the prepared colloidal solutions in grids were observed with a transmission electron microscope (TEM), similarly to Embodiment 1A. FIG. 18 shows examples of the platinum nanoparticles obtained in Comparative example 1A along with the standard size. As shown, the particle diameters of the platinum nanoparticles were 10 nm or less, and, in particular, about 3 through 4 nm, but the platinum nanoparticles supported on surfaces of particles of carbon black had irregular shapes.

COMPARATIVE EXAMPLE 2A

Comparative example 2A in which PAA is added early in the producing steps will be explained. In Comparative example 2A, potassium iodide is added after the addition of PAA. A predetermined volume (300 cc) of a purified water (dispersion medium), 12.45 mg ($3.0 \times 10^{-5}$ mol) of potassium tetrachloroplatinate (II) ($K_3PtCl_4$, complex compound), 249.02 mg ($1.5 \times 10^{-3}$ mol) of potassium iodide (KI), 5.64 mg ($1.7 \times 10^{-6}$ mol) of PAA (capping reagent) and 13.67 mg of carbon black (carbon support) were prepared, similarly to Embodiment 1A. Carbon black was Ketjen black (manufactured by Lion Corporation, Ketjen EC300JD), similarly to Embodiment 1A.

With Comparative example 2A, by dispersing carbon black in the purified water, a dispersion liquid was prepared. Then, potassium tetrachloroplatinate (II) ($K_3PtCl_4$) was added to the dispersion liquid. Next, PAA was added to the dispersion liquid to form a mixture liquid. Then, potassium iodide (KI) was added to the mixture liquid.

By bubbling hydrogen gas in the mixture liquid, the reduction treatment was carried out. Bubbling was carried out by blowing hydrogen gas in the mixture liquid for a predetermined time (10 min) under the condition of 300 ml/min, similarly to Embodiments 1A and 2. Next, the holding step was carried out by allowing the mixture liquid to stand for a whole day and night (10 hours) in a tightly sealed state, thereby forming a colloidal solution containing carbon black supporting platinum nanoparticles.

In Comparative example 2A, carbon black potassium tetrachloroplatinate (II)→PAA→potassium iodide (KI) are added to the purified water in this order. Where carbon black is represented by CB, potassium tetrachloroplatinate (II) is represented by PT, potassium iodide is represented by KI, and sodium polyacrylate is represented by PAA, they are added to the purified water in the order of CB→PT→PAA→KI. And where the molar ratio is expressed relative to the platinum complex (PT) of 1, they are added to the purified water in the order of CB→PT1→PAA2→KI50. It is considered that with this mixing order, PAA is added before the addition of potassium iodide so that PAA is adsorbed on carbon black without favorably acting on platinum.

Figure 19:
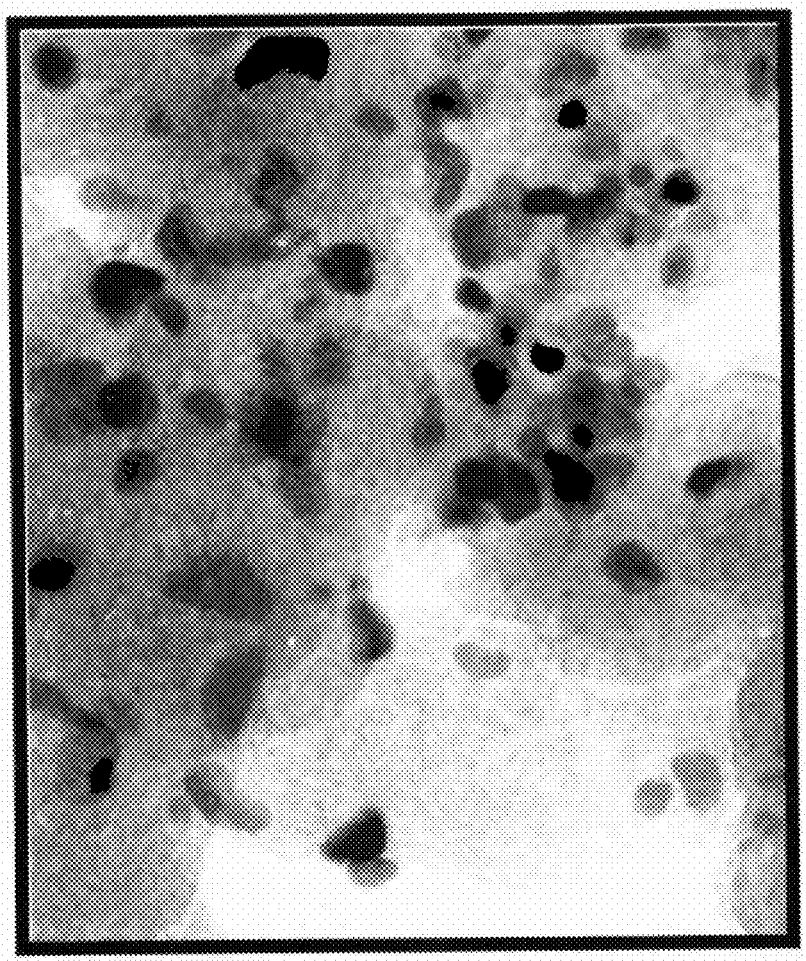
FIG. 19 is an electron microscope photograph of platinum nanoparticles.

Furthermore, the shapes and the particle diameters of the platinum nanoparticles of samples prepared by casting several drops of the colloidal solutions in grids were observed with a transmission electron microscope (TEM, manufactured by JEOL Ltd. type JEM-2000EX). FIG. 19 shows examples of the platinum nanoparticles obtained in Comparative example 2A along with the standard size. As shown, the particle diameters of the platinum nanoparticles were 10 nm or less, and, in particular, about 3 through 4 nm, but the platinum nanoparticles supported on surfaces of particles of carbon black had irregular shapes.

Embodiment 1B

The present embodiment is basically similar to Embodiment 1A, and exhibits operational advantages basically similar to those of Embodiment 1A. Acetylene black (manufactured by Denki Kagaku Kogyo K.K., Denka black) was used as carbon black. Upon measuring with BET method ($N_2$), the specific surface area of carbon black was 30 through 40 $m^2/g$. With the present embodiment, the platinum nanoparticles with polyhedral shapes can be efficiently formed and supported on surfaces of the carbon support.

With the present embodiment, upon expressing the molar ratio relative to platinum complex of 1, the materials were added to the purified water in the order of CB→PT1→KI150→PAA2. In the present embodiment, the polyhedral platinum nanoparticles with cubic or substantially cubic shapes were also supported on surfaces of particles of carbon black. The particle diameter of the platinum nanoparticle was 10 nm or less, and, in particular, as fine as about 2 through 3 nm.

Embodiment 2B

The present embodiment is basically similar to Embodiment 2A, and can exhibit operational advantages similar to those of Embodiment 2A. Acetylene black (manufactured by Denki Kagaku Kogyo K.K., Denka black granular substances) was used as carbon black. With the present embodiment, upon expressing the molar ratio relative to platinum complex (PT) of 1, the materials were added to the purified water in the order of CB→KI25→PT1→KI25→PAA2. In the present embodiment, it was confirmed that the polyhedral platinum nanoparticles with cubic or substantially cubic shapes had been supported on surfaces of particles of carbon black. It was confirmed that the particle diameter of the platinum nanoparticle was 10 nm or less, and, in particular, as fine as about 2 through 3 nm.

With the present embodiment, potassium iodide (adsorbent) was mixed in a dispersion liquid before and after the mixing time of the platinum compound, similarly to Embodiment 2A. Consequently, the materials were mixed in the order of carbon black (carbon support)→potassium iodide (adsorbent)→potassium tetrachloroplatinate (II) (platinum compound)→potassium iodide (adsorbent), similarly to Embodiment 2. In this case, potassium iodide as the adsorbent is expected to catch the platinum compound, and it can be expected that the contact area and the contact frequency between the adsorbent and the platinum compound are increased thereby, similarly to Embodiment 2.

Embodiment 1C

The present embodiment is basically similar to Embodiment 1A, and exhibits operational advantages basically similar to those of Embodiment 1A. The amount of PAA is determined to be 10 times that in Embodiment 1A. With the present embodiment, when the molar ratio is expressed relative to platinum complex (PT) of 1, the materials are added to the purified water in the order of CB→PT1→KI50→PAA20. In the present embodiment, the polyhedral platinum nanoparticles with cubic or substantially cubic shapes are to be supported on surfaces of particles of carbon black.

Embodiment 2C

The present embodiment is basically similar to Embodiment 2A, and exhibits operational advantages basically similar to those of Embodiment 2A. The amount of PAA is determined to be 10 times that in Embodiment 2A. With the present embodiment, when the molar ratio is expressed relative to platinum complex (PT) of 1, the materials are added to the purified water in the order of CB→KI25→PT1→KI25→PAA20. In the present embodiment, the polyhedral platinum nanoparticles with cubic or substantially cubic shapes are to be supported on surfaces of particles of carbon black.

Embodiment 1D

The present embodiment is basically similar to Embodiment 1A, and exhibits operational advantages basically similar to those of Embodiment 1A. The amount of PAA is determined to be 10 times that in Embodiment 1A. Acetylene black (manufactured by Denki Kagaku Kogyo K.K., Denka black granular substances) is used as carbon black. Upon measuring with BET method ($N_2$), the specific surface area of carbon black ranges from 30 to 40 $m^2/g$. With the present embodiment, when the molar ratio is expressed relative to platinum complex (PT) of 1, the materials are added to the purified water in the order of CB→PT1→KI50→PAA20. In the present embodiment, the polyhedral platinum nanoparticles with cubic or substantially cubic shapes are to be supported on surfaces of particles of carbon black.

Embodiment 2D

The present embodiment is basically similar to Embodiment 2A, and exhibits operational advantages basically similar to those of Embodiment 2A. Acetylene black (manufactured by Denki Kagaku Kogyo K.K., Denka black granular substances) is used as carbon black. The amount of PAA is determined to be 10 times as large as that in Embodiment 1A. With the present embodiment, when the molar ratio is expressed relative to platinum complex (PT) of 1, the materials are added to the purified water in the order of CB→KI25→PT1→KI25→PAA20. The polyhedral platinum nanoparticles with cubic or substantially cubic shapes are to be supported on surfaces of particles of carbon black.

Embodiment 1E

The present embodiment is basically similar to Embodiment 1A, and exhibits operational advantages basically similar to those of Embodiment 1A. Acetylene black (manufactured by Denki Kagaku Kogyo K.K., Denka black granular substances) is used as carbon black. The amount of potassium iodide (KI) is determined to be 2 times that in Embodiment 1A. With the present embodiment, when the molar ratio is expressed relative to platinum complex (PT) of 1, the materials are added to the purified water in the order of CB→PT1→KI100 (50×2)→PAA2. In the present embodiment, the polyhedral platinum nanoparticles with cubic or substantially cubic shapes are to be supported on surfaces of particles of carbon black.

Embodiment 2E

The present embodiment is basically similar to Embodiment 2A, and exhibits operational advantages basically similar to those of Embodiment 2A. Acetylene black (manufactured by Denki Kagaku Kogyo K.K., Denka black granular substances) is used as carbon black. The amount of PAA is determined to be 10 times that in Embodiment 2. In addition, the amount of potassium iodide (KI) is increased, as compared with the case of Embodiment 2A. More specifically, the amount of potassium iodide (KI) to be added in the second time is increased, as compared with the case of Embodiment 2A. With the present embodiment, when the molar ratio is expressed relative to platinum complex (PT) of 1, the materials are added to the purified water in the order of CB→KI25→PT1→KI50→PAA2. In the present embodiment, the polyhedral platinum nanoparticles with cubic or substantially cubic shapes are to be supported on surfaces of particles of carbon black.

Embodiment 1F

The present embodiment is basically similar to Embodiment 1A, and exhibits operational advantages basically similar to those of Embodiment 1A. Ketjen black (manufactured by Lion Corporation, Ketjen EC300JD) is used as carbon black. The amount of potassium iodide (KI) is determined to be 2 times as large as that in Embodiment 1A. With the present embodiment, when the molar ratio is expressed relative to platinum complex (PT) of 1, the materials are added to the purified water in the order of CB→PT1→KI100→PAA2. In the present embodiment, the polyhedral platinum nanoparticles with cubic or substantially cubic shapes are to be supported on surfaces of particles of carbon black.

Embodiment 2F

The present embodiment is basically similar to Embodiment 2A, and exhibits operational advantages basically similar to those of Embodiment 2A. Ketjen black (manufactured by Lion Corporation, Ketjen EC300JD) is used as carbon black. The amount of PAA is determined to be 10 times that in Embodiment 2A. More specifically, the amount of potassium iodide (KI) added in the second time is increased to be 2 times that in Embodiment 2A. With the present embodiment, when the molar ratio is expressed relative to platinum complex (PT) of 1, the materials are added to the purified water in the order of CB→KI25→PT1→KI50→PAA20. In the present embodiment, the polyhedral platinum nanoparticles with cubic or substantially cubic shapes are supported on surfaces of particles of carbon black.

EXAMPLES OF USES

Carbon black supporting platinum nanoparticles in accordance with the present embodiments can be used as catalysts for electrodes in fuel cells, etc. A well-known method can be preferably adopted as the method for producing electrodes for fuel cells. More specifically, by mixing carbon black supporting platinum nanoparticles and a solution of polymer electrolyte (Nafion (trademark) solution, for example) with each other, an ink or a slurry can be formed. The formed ink or slurry is applied to surfaces of a membrane electrolyte film adapted to compose a membrane electrode assembly. Alternatively, the formed ink or slurry can be applied to a surface of a gas diffusion layer composed of assemblies of carbon fibers, which faces an electrolyte film.

[Others]

The method according to the third aspect is not limited to Embodiments 1A through 1F, and 2A through 2F, but can be also properly modified within the scope of the invention. With Embodiment 1A, as described above, the molar ratio is determined to be PT1→KI50→PAA2, but is not limited to this molar ratio. The molar ratio may be PT1→KI10~100→PAA1~100. With Embodiment 2A, as described above, the molar ratio is determined to be KI25→PT1→KI25→PAA2, but is not limited to this molar ratio. The molar ratio may be KI10~50PT1→KI10~70→PAA1~10.

With the above-described Embodiments 1A through 1F, and 2A through 2F, PAA is adopted as the capping reagent, but it is considered that polyvinylpyrrolidone, polyvinyl alcohol, polyacrylamide, polyethyleneimine, and polyethylene oxide also achieve similar advantageous effect to that of PAA. The concentration of potassium tetrachloroplatinate (II) is not limited to that of embodiments, but can be arbitrarily adjusted. The hydrogen reduction step was carried out by blowing hydrogen gas into a mixture liquid for 10 min under the condition of 300 ml/min, thereby bubbling the same. The flow rate of hydrogen gas per unit time is not limited to the above rate, but can be changed to the range from 50 to 3000 ml/min, etc. according to the volume of the mixture liquid, etc. The blowing time is not limited to 10 min, but can be arbitrarily changed to 5 min, 20 min, 40 min, etc.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for producing platinum nanoparticles, comprising:
a preparing step of preparing a carbon support, a dispersion medium, a platinum compound having platinum, an adsorbent having at least one of elements of alkali metals and alkali earth metals, which is adsorbable on surfaces of said carbon support, and a capping reagent capable of capping specific areas of crystals of platinum;
a first mixture liquid forming step of forming a mixture liquid in which said dispersion medium, said carbon support, said platinum compound and said adsorbent are mixed with each other, wherein in said first mixture liquid forming step, said first mixture liquid is formed by mixing said platinum compound in said dispersion liquid in which said carbon support has been dispersed, and thereafter by mixing said adsorbent in said dispersion medium; wherein, optionally, one part of said adsorbent is mixed in said dispersion medium in which said carbon support has been dispersed, prior to said mixing of said platinum compound in said dispersion liquid; and
a second mixture liquid forming step of forming a second mixture liquid in which said first mixture liquid and said capping reagent are mixed with each other; and
a reducing step, wherein said second mixture liquid is reduced with a reducing agent to form platinum nanoparticles on said carbon support, wherein said method minimizes aggregation of the platinum nanoparticles formed on said carbon support.

2. A method for producing platinum nanoparticles, as claimed in claim 1, wherein in said first mixture liquid forming step, said first mixture liquid is formed: (i) by mixing one part of said adsorbent in said dispersion medium in which said carbon support has been dispersed; (ii) by mixing said platinum compound in said dispersion liquid; (iii) and by mixing a remaining part of said adsorbent in said dispersion liquid.

3. A method for producing platinum nanoparticles, as claimed in claim 1, wherein in said first mixture liquid forming step, said first mixture liquid is formed by mixing said platinum compound in said dispersion liquid in which said carbon support has been dispersed, and thereafter by mixing said adsorbent in said dispersion medium.

4. A method for producing platinum nanoparticles, as claimed in claim 1, wherein said adsorbent has at least one of sodium (Na), potassium (K), rubidium (Rb), caesium (Cs), beryllium (Be), magnesium (Mg), calcium (Ca), strontium (Sr), and barium (Ba).

5. A method for producing platinum nanoparticles, as claimed in claim 1, wherein said adsorbent has at least one of an iodide, a chloride and a bromide.

6. A method for producing platinum nanoparticles, as claimed in claim 1, wherein said capping reagent is composed of at least one of sodium polyacrylate, polyvinylpyrrolidone, polyvinyl alcohol, polyacrylamide, polyethyleneimine, and polyethylene oxide.

7. A method for producing platinum nanoparticles, as claimed in claim 1, wherein said platinum nanoparticle has a polyhedral shape.

8. A method for producing platinum nanoparticles, as claimed in claim 1, wherein said platinum nanoparticle has a particle diameter of 50 nm or less.

* * * * *